(12) United States Patent
Altenhofen et al.

(10) Patent No.: US 7,237,189 B2
(45) Date of Patent: Jun. 26, 2007

(54) OFFLINE E-LEARNING SYSTEM

(75) Inventors: Michael Altenhofen, Karlsruhe (DE); Andreas S. Krebs, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 382 days.

(21) Appl. No.: 10/414,436

(22) Filed: Apr. 15, 2003

(65) Prior Publication Data

US 2003/0232318 A1 Dec. 18, 2003

Related U.S. Application Data

(63) Continuation-in-part of application No. 10/208,204, filed on Jul. 31, 2002, which is a continuation-in-part of application No. 10/134,676, filed on Apr. 30, 2002.

(60) Provisional application No. 60/354,945, filed on Feb. 11, 2002.

(51) Int. Cl.
*G06F 15/00* (2006.01)

(52) U.S. Cl. .................. 715/511; 434/318; 434/350; 709/203

(58) Field of Classification Search .............. 715/514, 715/511; 434/276, 350, 369, 118; 703/22; 709/223
See application file for complete search history.

(56) References Cited

U.S. PATENT DOCUMENTS

| | | | |
|---|---|---|---|
| 5,008,853 A | 4/1991 | Bly et al. | |
| 5,310,349 A | 5/1994 | Daniels et al. | |
| 5,395,243 A | * | 3/1995 | Lubin et al. ............ 434/118 |
| 5,584,699 A | 12/1996 | Silver | |
| 5,675,802 A | 10/1997 | Allen et al. | |
| 5,692,125 A | 11/1997 | Schloss et al. | |
| 5,727,950 A | 3/1998 | Cook et al. | |
| 5,727,951 A | 3/1998 | Ho et al. | |
| 5,788,508 A | 8/1998 | Lee et al. | |
| 5,802,514 A | 9/1998 | Huber | |
| 5,881,315 A | 3/1999 | Cohen | |
| 6,011,949 A | 1/2000 | Shimomukai | |
| 6,014,134 A | 1/2000 | Bell et al. | |

(Continued)

FOREIGN PATENT DOCUMENTS

GB 2373625 A 9/2002

(Continued)

OTHER PUBLICATIONS

Java Applets for Microelectronics Education http://www.ewh.ieee.org/soc/es/May2001/04/Begin.htm.*

(Continued)

*Primary Examiner*—William Bashore
*Assistant Examiner*—Quoc A. Tran
(74) *Attorney, Agent, or Firm*—Fish & Richardson P.C.

(57) ABSTRACT

A learning system maintains an account of a student's information, courses, skills, and qualifications. The student may take courses offered by the learning system online or offline. To take a course offline course information is downloaded to an offline player at the student's location; however, the state of the student in the course is maintained by the learning system (online). A state manager is provided between the offline player and the student's account in the learning system. The state manager uses four states to transition between online and offline in order to ensure the integrity and synchronization of the online learner account.

20 Claims, 20 Drawing Sheets

U.S. PATENT DOCUMENTS

| | | | |
|---|---|---|---|
| 6,029,043 | A | 2/2000 | Ho et al. |
| 6,091,930 | A | 7/2000 | Mortimer et al. |
| 6,099,320 | A | 8/2000 | Papadopoulos |
| 6,112,049 | A | 8/2000 | Sonnenfeld |
| 6,134,552 | A | 10/2000 | Fritz et al. |
| 6,148,338 | A | 11/2000 | Lachelt et al. |
| 6,149,438 | A | 11/2000 | Richard et al. |
| 6,149,441 | A | 11/2000 | Pellegrino et al. |
| 6,162,060 | A | 12/2000 | Richard et al. |
| 6,164,974 | A | 12/2000 | Carlile et al. |
| 6,175,841 | B1 | 1/2001 | Loiacono |
| 6,315,572 | B1 | 11/2001 | Owens et al. |
| 6,325,632 | B1 | 12/2001 | Chao et al. |
| 6,336,813 | B1 | 1/2002 | Siefert |
| 6,347,333 | B2 | 2/2002 | Eisendrath et al. |
| 6,347,943 | B1 | 2/2002 | Fields et al. |
| 6,368,110 | B1 | 4/2002 | Koenecke et al. |
| 6,370,355 | B1 | 4/2002 | Ceretta et al. |
| 6,381,444 | B1 | 4/2002 | Aggarwal et al. |
| 6,397,036 | B1 | 5/2002 | Thean et al. |
| 6,398,556 | B1 | 6/2002 | Ho et al. |
| 6,430,563 | B1 | 8/2002 | Fritz et al. |
| 6,470,171 | B1 | 10/2002 | Helmick et al. |
| 6,471,521 | B1 | 10/2002 | Dornbush et al. |
| 6,514,085 | B2 | 2/2003 | Slattery et al. |
| 6,527,556 | B1 | 3/2003 | Koskinen |
| 6,587,668 | B1 | 7/2003 | Miller et al. |
| 6,606,479 | B2 | 8/2003 | Cook et al. |
| 6,606,480 | B1 | 8/2003 | L'Allier et al. |
| 6,622,003 | B1 | 9/2003 | Denious et al. |
| 6,633,742 | B1 | 10/2003 | Turner et al. |
| 6,643,493 | B2 | 11/2003 | Kilgore |
| RE38,432 | E | 2/2004 | Fai et al. |
| 6,701,125 | B1 | 3/2004 | Lohse |
| 6,709,330 | B1 | 3/2004 | Klein et al. |
| 6,729,885 | B2 | 5/2004 | Stuppy et al. |
| 6,801,751 | B1 | 10/2004 | Wood et al. |
| 6,988,138 | B1 | 1/2006 | Alcorn et al. |
| 2001/0018178 | A1 | 8/2001 | Siefert |
| 2001/0044728 | A1 | 11/2001 | Freeman et al. |
| 2001/0047310 | A1 | 11/2001 | Russell |
| 2002/0006603 | A1 | 1/2002 | Peterson et al. |
| 2002/0042041 | A1 | 4/2002 | Owens et al. |
| 2002/0061506 | A1* | 5/2002 | Catten et al. ............... 434/369 |
| 2002/0073063 | A1 | 6/2002 | Faraj |
| 2002/0087496 | A1* | 7/2002 | Stirpe et al. .................. 706/45 |
| 2002/0107681 | A1* | 8/2002 | Goodkovsky ............... 703/22 |
| 2002/0138841 | A1 | 9/2002 | Ward |
| 2002/0142278 | A1 | 10/2002 | Whitehurst et al. |
| 2002/0168621 | A1 | 11/2002 | Cook et al. |
| 2002/0188583 | A1 | 12/2002 | Rukavina et al. |
| 2002/0197593 | A1* | 12/2002 | Sutton ........................ 434/276 |
| 2003/0013073 | A1 | 1/2003 | Duncan et al. |
| 2003/0049593 | A1 | 3/2003 | Parmer et al. |
| 2003/0073063 | A1 | 4/2003 | Dattaray et al. |
| 2003/0073065 | A1* | 4/2003 | Riggs ........................ 434/350 |
| 2003/0082508 | A1 | 5/2003 | Barney |
| 2003/0113700 | A1 | 6/2003 | Simon |
| 2003/0126136 | A1 | 7/2003 | Omoigui |
| 2003/0129576 | A1 | 7/2003 | Wood et al. |
| 2003/0151629 | A1 | 8/2003 | Krebs et al. |
| 2003/0152899 | A1 | 8/2003 | Krebs et al. |
| 2003/0152900 | A1 | 8/2003 | Krebs et al. |
| 2003/0152901 | A1 | 8/2003 | Altenhofen et al. |
| 2003/0152902 | A1 | 8/2003 | Altenhofen et al. |
| 2003/0152903 | A1 | 8/2003 | Theilmann |
| 2003/0152904 | A1 | 8/2003 | Doty, Jr. |
| 2003/0152905 | A1 | 8/2003 | Altenhofen et al. |
| 2003/0152906 | A1 | 8/2003 | Krebs et al. |
| 2003/0157470 | A1 | 8/2003 | Altenhofen et al. |
| 2003/0163784 | A1* | 8/2003 | Daniel et al. ............... 715/514 |
| 2003/0175664 | A1 | 9/2003 | Frangenheim et al. |
| 2003/0175676 | A1 | 9/2003 | Theilmann et al. |
| 2003/0195946 | A1 | 10/2003 | Yang |
| 2003/0211447 | A1* | 11/2003 | Diesel et al. ............... 434/118 |
| 2003/0224339 | A1 | 12/2003 | Jain et al. |
| 2004/0081951 | A1 | 4/2004 | Vigue et al. |
| 2005/0079477 | A1 | 4/2005 | Diesel et al. |
| 2005/0204337 | A1 | 9/2005 | Diesel et al. |
| 2005/0216923 | A1 | 9/2005 | Krebs |
| 2006/0059253 | A1* | 3/2006 | Goodman et al. .......... 709/223 |
| 2006/0168233 | A1 | 7/2006 | Alcorn et al. |

FOREIGN PATENT DOCUMENTS

| | | |
|---|---|---|
| WO | WO 99/09490 | 2/1999 |
| WO | WO 02/21379 | 3/2002 |
| WO | WO 02/073442 A | 9/2002 |

OTHER PUBLICATIONS

Chang et al. "Web Browsing in a Wireless Environment: Disconnected and Asynchronous operation in ARTour Web Express" □□IBM Reasearch Center—Published ACM Press 1997 pp. 260-269.*

U.S. Appl. No. 60/201,500, filed May 3, 2000, Adams.

U.S. Appl. No. 60/272,251, filed Feb. 28, 2001, Ward.

U.S. Appl. No. 60/329,088, filed Oct. 12, 2001, Riggs.

U.S. Appl. No. 60/334,714, filed Nov. 1, 2001, Diesel.

U.S. Appl. No. 60/400,606, filed Aug. 1, 2002, Diesel.

Hewlett Packard, "HP OpenView Integration Guide for Developers," Jul. 2002, [online], [retrieved from the Internet on Mar. 24, 2004: http://h21007.www2.hp.com/dspp/files/unprotected/OpenView/IntegrationGuide/OV_Integration_Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Sun Microsystems, "Developing Web Services with SUN™ Open Network Environment," Mar. 2002, [online], [retrieved from the Internet Mar. 24, 2004: http:www.sun.com/software/sunone/wp-spine/spine.pdf], pp. 1-32, XP002274909.

Trythall, Steve, "JMS and CORBA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Global Knowledge Network, Inc., "On Demand Personal Navigator," http://kp.globalknowledge.com/products/od/index.asp, Sep. 2002, 2 pgs.

x.hlp, "Software for faster learning," http://www.xhlp.com/home.cfm, Apr. 2003, 7 pgs.

Eugster, Patrick, et al., "Distributed Asynchronous Collections: Abstractions for Publish/Subscribe Interaction," Agilent Lab. and Lombard Odier Co., Jan. 10, 2000, pp. 1-34, XP002171795.

Shorshita, Teruji, et al., "A Large-scale Contents Distribution Architecture Based on Reliable Multicast," Proceedings Internet Workshop, 1999, IWS '99 Osaka, Japan, Feb. 18-20, 1999, pp. 75-80, XP010365597.

Lipkin, Daniel, "Universal Learning Format Technical Specification," Jan. 13, 2001, retrieved from the Internet on Jul. 29, 2004, at http://xml.coverpages.org/ulf.html, XP002290517, pp. 1-3.

Jörg Siekmann et al., "Adaptive Course Generation and Presentation," ITS Workshop on Adaptive and Intelligent Web-Based Foundation System, Montreal, The Omega Group; pp. 1-10, 2000.

Lai Jin et al., "An Ontology-Aware Authoring Tool—Functional structure and guidance generation," Proceedings of AIED '99, pp. 85-92, LeManns France, 1999.

Dietrich Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 1997.

Sylvie Ranwez et al., "Description and Construction of Pedagogical Material using an Ontology based DTD," AIED '99 Workshop 2 proceedings "Ontologies for Intelligent Educational Systems", pp. 1-4, 1999.

Michael Jungmann et al., "Adaptive Hypertext in Complex Information Spaces," Daimler-Benz Research & Technology, Technical University of Ilmenau, pp. 1-5, Mar. 8, 1997.

Nicola Henze et al., "Modeling Constructivist Teaching Functionality and Structure in the KBS Hyperbook System," University of Hannover, pp. 1-12, Jun. 4, 1999.

Max Mühlhäuser, "Cooperative Computer-Aided Authoring and Learning," University of Karlsruhe, pp. 107-130, 145-161, 165-192, 273-291, 293-318, 1995.

Professor Jouko Paaso, "A New Environment for Courseware Development, Course Delivery and Training," Proceedings of the ED-Media 97, Toronto, 1997.

* cited by examiner

OFFLINE E-LEARNING SYSTEM

OFFLINE E-LEARNING SYSTEM

This application is a continuation in part of U.S. application Ser. No. 10/208,204, filed Jul. 31, 2002, and titled OFFLINE E-LEARNING which is a continuation in part of U.S. application Ser. No. 10/134,676, filed Apr. 30, 2002, and titled E-LEARNING SYSTEM, which claims priority to U.S. Provisional Application No. 60/354,945, filed Feb. 11, 2002, and titled FLEXIBLE INSTRUCTIONAL ARCHITECTURE FOR E-LEARNING, all of which are hereby incorporated by reference in their entirety for all purposes.

TECHNICAL FIELD

The following description relates generally to e-learning and in particular to offline e-learning.

BACKGROUND

Systems and applications for delivering computer-based training (CBT) have existed for many years. However, CBT systems historically have not gained wide acceptance. A problem hindering the reception of CBTs as a means of training workers and learners is the compatibility between systems. A CBT system works as a stand-alone system that is unable to use content designed for use with other CBT systems.

Early CBTs also were based on hypermedia systems that statically linked content. User guidance was given by annotating the hyperlinks with descriptive information. The trainee could proceed through learning material by traversing the links embedded in the material. The structure associated with the material was very rigid, and the material could not be easily written, edited, or reused to create additional or new learning material.

Newer methods for intelligent tutoring and CBT systems are based on special domain models that must be defined prior to creation of the course or content. Once a course is created, the material may not be easily adapted or changed for different learners' specific training needs or learning styles. As a result, the courses often fail to meet the needs of the trainee and/or trainer.

The special domain models also have many complex rules that must be understood prior to designing a course. As a result, a course is too difficult for most authors to create who have not undergone extensive training in the use of the system. Even authors who receive sufficient training may find the system difficult and frustrating to use. In addition, the resulting courses may be incomprehensible due to incorrect use of the domain model by the authors creating the course.

Furthermore, although online training provides a robust environment for learning, it is not always convenient for a learner to take courses online. In addition, there are also times when an online connection is not available. Therefore, for the above and other reasons, new methods and technology are needed to supplement traditional computer based training and instruction and provide offline training.

SUMMARY

In one general aspect, offline learning may be used to process courses (e.g., training material and tests) offline, locally at a learning station without being connected to a learning system. To accommodate offline learning, learning state derived from a central learner account may be stored locally at the learning station and synchronized with the learning system at specified times so that the learner's accumulated knowledge, progress, and processed training is always maintained in a consistent state.

The offline player used to work on a course offline is passive. A learner may take a course offline only if permission is given to the offline player of the learning station to work offline. Similarly, a learner account may be updated by the offline player only if permission is given and no transfer errors occur.

A state manger is provided between the offline player and the learner account. Four states are used to maintain data integrity and synchronization: "online," "going offline," "offline," and "going online." When a learner wishes to go offline, the learning system updates the user's status to "going offline." The learner portal provides a URL to the learning station's browser. The URL directs the learner's browser to contact the state manager. The state manager returns a file with a course package list. The browser recognizes the file type as being handled by the offline player. The offline player is then started and reads the file and contacts a content management system to download the content files for the course.

The offline player also contacts the state manager to obtain the learner specific information. The state manager obtains the learner account information and provides the information to the offline player. Once the offline player is ready, the offline player informs the state manager and the state manager updates the state of the user to "offline." The state manager returns a message to the offline player that the state is "offline" and the offline player allows the learner to access/take the course with the user interface.

If an error occurs during the transfer process, the course remains locked (even if the content and/or learner information is downloaded to the offline player) and the offline player does not allow the learner to access the course.

A similar procedure is used to go back online. When a learner wishes to go online, the learning station connects to the learning system to update the user's status to "going online." The learning system provides a URL to the learner's browser. The URL directs the learner's browser to contact the state manger. The state manger returns a file for the necessary learner information that is used to update the learner's account. The browser recognizes the file type as being handled by the offline player. The offline player then starts and contacts the state manager and provides the learner specific information. The state manager updates the learner account information. Once done the offline player indicates the transfer is complete and, if the transfer is successful, the state manager updates the status to "online."

Other features and advantages will be apparent from the description, the drawings, and the claims.

DESCRIPTION OF DRAWINGS

Like reference symbols in the various drawings indicate like elements.

DETAILED DESCRIPTION

E-learning Content Structure

The e-learning system and methodology structures content so that the content is reusable and flexible. For example, the content structure allows the creator of a course to reuse existing content to create new or additional courses. In addition, the content structure provides flexible content delivery that may be adapted to the learning styles of different learners.

Figure 1:
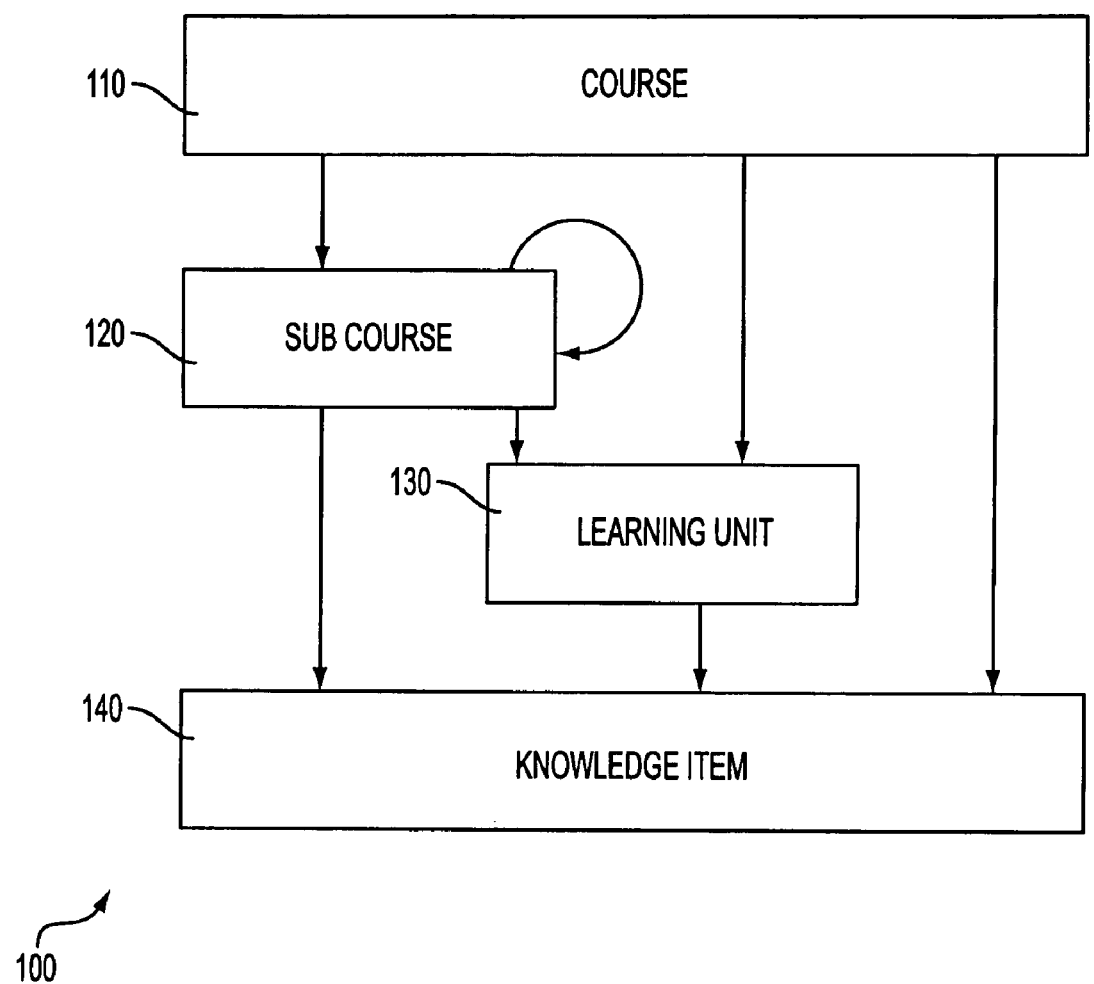
FIG. 1 is an exemplary content aggregation model.

E-learning content may be aggregated using a number of structural elements arranged at different aggregation levels. Each higher level structural element may refer to any instances of all structural elements of a lower level. At its lowest level, a structural element refers to content and may not be further divided. According to one implementation shown in FIG. 1, course material 100 may be divided into four structural elements: a course 110, a sub-course 120, a learning unit 130, and a knowledge item 140.

Starting from the lowest level, knowledge items 140 are the basis for the other structural elements and are the building blocks of the course content structure. Each knowledge item 140 may include content that illustrates, explains, practices, or tests an aspect of a thematic area or topic. Knowledge items 140 typically are small in size (i.e., of short duration, e.g., approximately five minutes or less).

A number of attributes may be used to describe a knowledge item 140, such as, for example, a name, a type of media, and a type of knowledge. The name may be used by a learning system to identify and locate the content associated with a knowledge item 140. The type of media describes the form of the content that is associated with the knowledge item 140. For example, media types include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer based training, a simulation, and a test.

A knowledge item 140 also may be described by the attribute of knowledge type. For example, knowledge types include knowledge of orientation, knowledge of action, knowledge of explanation, and knowledge of source/reference. Knowledge types may differ in learning goal and content. For example, knowledge of orientation offers a point of reference to the learner, and, therefore, provides general information for a better understanding of the structure of interrelated structural elements. Each of the knowledge types is described in further detail below.

Knowledge items 140 may be generated using a wide range of technologies, however, a browser (including plug-in applications) should be able to interpret and display the appropriate file formats associated with each knowledge item. For example, markup languages (such as a Hypertext Markup language (HTML), a standard generalized markup language (SGML), a dynamic HTML (DHTML), or an extensible markup language (XML)), JavaScript (a client-side scripting language), and/or Flash may be used to create knowledge items 140.

HTML may be used to describe the logical elements and presentation of a document, such as, for example, text, headings, paragraphs, lists, tables, or image references.

Flash may be used as a file format for Flash movies and as a plug-in for playing Flash files in a browser. For example, Flash movies using vector and bitmap graphics, animations, transparencies, transitions, MP3 audio files, input forms, and interactions may be used. In addition, Flash allows a pixel-precise positioning of graphical elements to generate impressive and interactive applications for presentation of course material to a learner.

Learning units 130 may be assembled using one or more knowledge items 140 to represent, for example, a distinct, thematically-coherent unit. Consequently, learning units 130 may be considered containers for knowledge items 140 of the same topic. Learning units 130 also may be considered relatively small in size (i.e., duration) though larger than a knowledge item 140.

Sub-courses 120 may be assembled using other sub-courses 120, learning units 130, and/or knowledge items 140. The sub-course 120 may be used to split up an extensive course into several smaller subordinate courses. Sub-courses 120 may be used to build an arbitrarily deep nested structure by referring to other sub-courses 120.

Courses may be assembled from the entire subordinate structural elements including sub-courses 120, learning units 130, and knowledge items 140. To foster maximum reuse, all structural elements should be self-contained and context free.

Structural elements also may be tagged with metadata that is used to support adaptive delivery, reusability, and search/retrieval of content associated with the structural elements. For example, learning object metadata (LOM) defined by the IEEE "Learning Object Metadata Working Group" may be attached to individual course structure elements. The metadata may be used to indicate learner competencies associated with the structural elements. Other metadata may include a number of knowledge types (e.g., orientation, action, explanation, and resources) that may be used to categorize structural elements.

Figure 2:
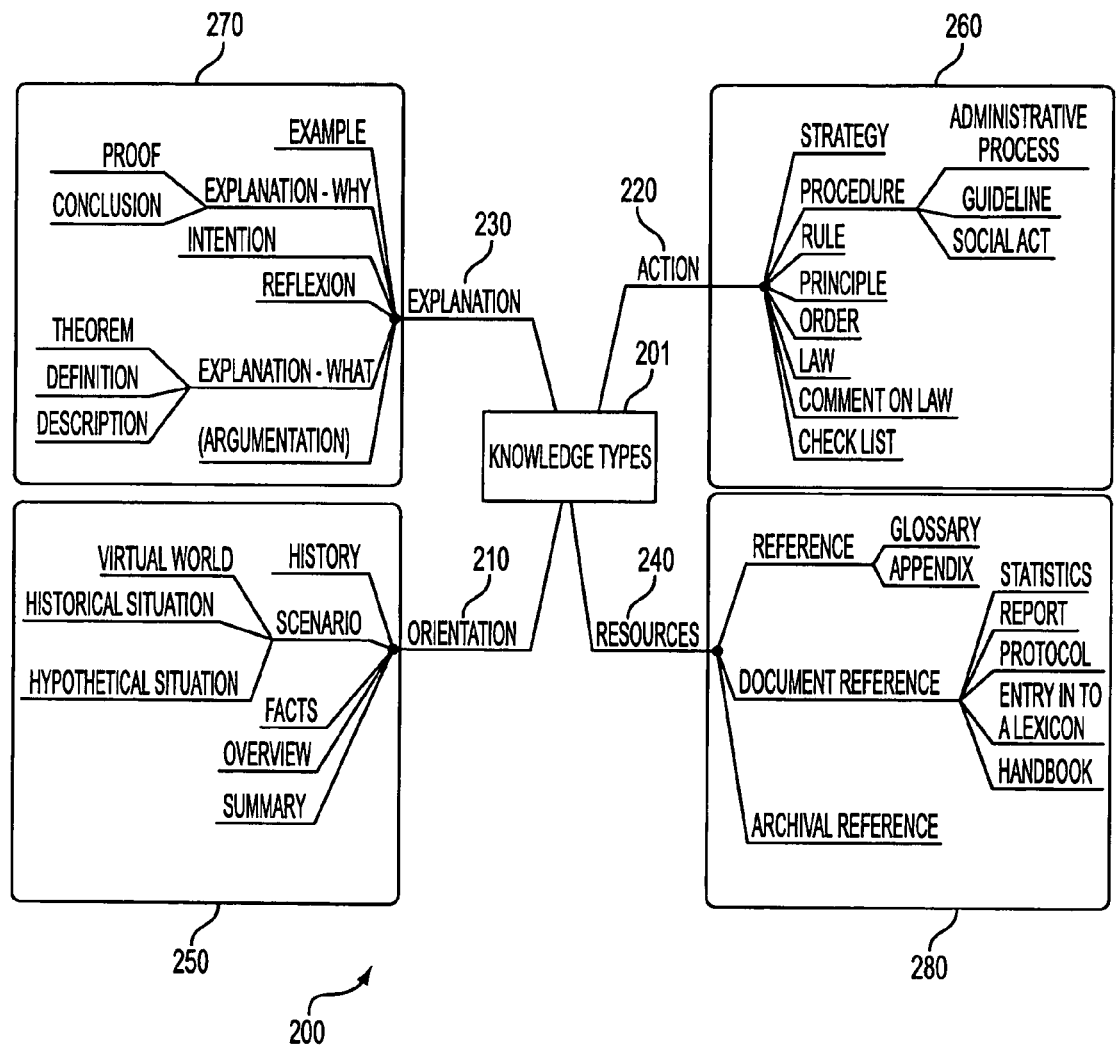
FIG. 2 is an example of an ontology of knowledge types.

As shown in FIG. 2, structural elements may be categorized using a didactical ontology 200 of knowledge types 201 that includes orientation knowledge 210, action knowledge 220, explanation knowledge 230, and reference knowledge 240. Orientation knowledge 210 helps a learner to find their way through a topic without being able to act in a topic-specific manner and may be referred to as "know what." Action knowledge 220 helps a learner to acquire topic related skills and may be referred to as "know how." Explanation knowledge 230 provides a learner with an explanation of why something is the way it is and may be referred to as "know why." Reference knowledge 240 teaches a learner where to find additional information on a specific topic and may be referred to as "know where."

The four knowledge types (orientation, action, explanation, and reference) may be further divided into a fine grained ontology as shown in FIG. 2. For example, orientation knowledge 210 may refer to sub-types 250 that include a history, a scenario, a fact, an overview, and a summary. Action knowledge 220 may refer to sub-types 260 that include a strategy, a procedure, a rule, a principle, an order, a law, a comment on law, and a checklist. Explanation knowledge 230 may refer to sub-types 270 that include an example, an intention, a reflection, an explanation of why or what, and an argumentation. Resource knowledge 240 may refer to sub-types 280 that include a reference, a document reference, and an archival reference.

Dependencies between structural elements may be described by relations when assembling the structural elements at one aggregation level. A relation may be used to describe the natural, subject-taxonomic relation between the structural elements. A relation may be directional or non-directional. A directional relation may be used to indicate that the relation between structural elements is true only in one direction. Directional relations should be followed. Relations may be divided into two categories: subject-taxonomic and non-subject taxonomic.

Subject-taxonomic relations may be further divided into hierarchical relations and associative relations. Hierarchical relations may be used to express a relation between structural elements that have a relation of subordination or superordination. For example, a hierarchical relation between the knowledge items A and B exists if B is part of A. Hierarchical relations may be divided into two categories: the part/whole relation (i.e., "has part") and the abstraction relation (i.e., "generalizes"). For example, the part/whole relation "A has part B," describes that B is part of A. The abstraction relation "A generalizes B" implies that B is a specific type of A (e.g., an aircraft generalizes a jet or a jet is a specific type of aircraft).

Associative relations may be used refer to a kind of relation of relevancy between two structural elements. Associative relations may help a learner obtain a better understanding of facts associated with the structural elements. Associative relations describe a manifold relation between two structural elements and are mainly directional (i.e., the relation between structural elements is true only in one direction). Examples of associative relations include "determines," "side-by-side," "alternative to," "opposite to," "precedes," "context of," "process of," "values," "means of," and "affinity."

The "determines" relation describes a deterministic correlation between A and B (e.g., B causally depends on A). The "side-by-side" relation may be viewed from a spatial, conceptual, theoretical, or ontological perspective (e.g., A side-by-side with B is valid if both knowledge objects are part of a superordinate whole). The side-by-side relation may be subdivided into relations, such as "similar to," "alternative to," and "analogous to." The "opposite to" relation implies that two structural elements are opposite in reference to at least one quality. The "precedes" relation describes a temporal relationship of succession (e.g., A occurs in time before B (and not that A is a prerequisite of B)). The "context of" relation describes the factual and situational relationship on a basis of which one of the related structural elements may be derived. An "affinity" between structural elements suggests that there is a close functional correlation between the structural elements (e.g., there is an affinity between books and the act of reading because reading is the main function of books).

Non Subject-Taxonomic relations may include the relations "prerequisite of" and "belongs to." The "prerequisite of" and the "belongs to" relations do not refer to the subject-taxonomic interrelations of the knowledge to be imparted. Instead, these relations refer to the progression of the course in the learning environment (e.g., as the learner traverses the course). The "prerequisite of" relation is directional whereas the "belongs to" relation is non-directional. Both relations may be used for knowledge items 140 that cannot be further subdivided. For example, if the size of the screen is too small to display the entire content on one page, the page displaying the content may be split into two pages that are connected by the relation "prerequisite of."

Another type of metadata is competencies. Competencies may be assigned to structural elements, such as, for example, a sub-course 120 or a learning unit 130. The competencies may be used to indicate and evaluate the performance of a learner as the learner traverse the course material. A competency may be classified as a cognitive skill, an emotional skill, a senso-motorical skill, or a social skill.

Figure 3:
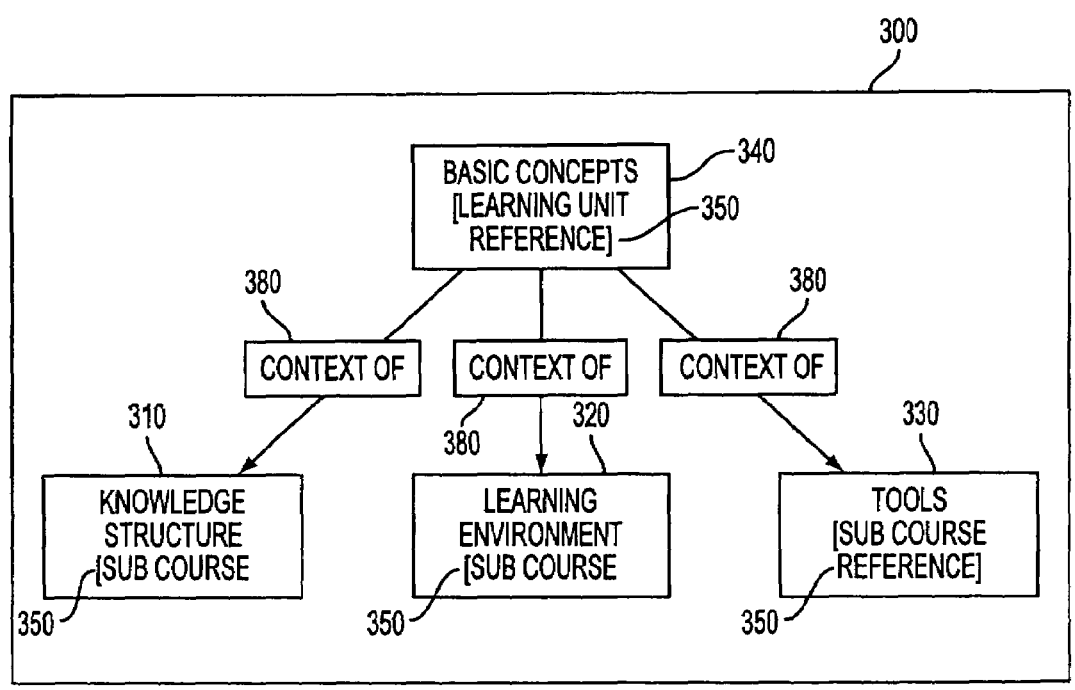
FIG. 3 is an example of a course graph for e-learning.

The content structure associated with a course may be represented as a set of graphs. A structural element may be represented as a node in a graph. Node attributes are used to convey the metadata attached to the corresponding structural element (e.g., a name, a knowledge type, a competency, and/or a media type). A relation between two structural elements may be represented as an edge. For example, FIG. 3 shows a graph 300 for a course. The course is divided into four structural elements or nodes (310, 320, 330, and 340): three sub-courses (e.g., knowledge structure, learning environment, and tools) and one learning unit (e.g., basic concepts). A node attribute 350 of each node is shown in brackets (e.g., the node labeled "Basic concepts" has an attribute that identifies it as a reference to a learning unit). In addition, an edge 380 expressing the relation "context of" has been specified for the learning unit with respect to each of the sub-courses. As a result, the basic concepts explained in the learning unit provide the context for the concepts covered in the three sub-courses.

Figure 4:
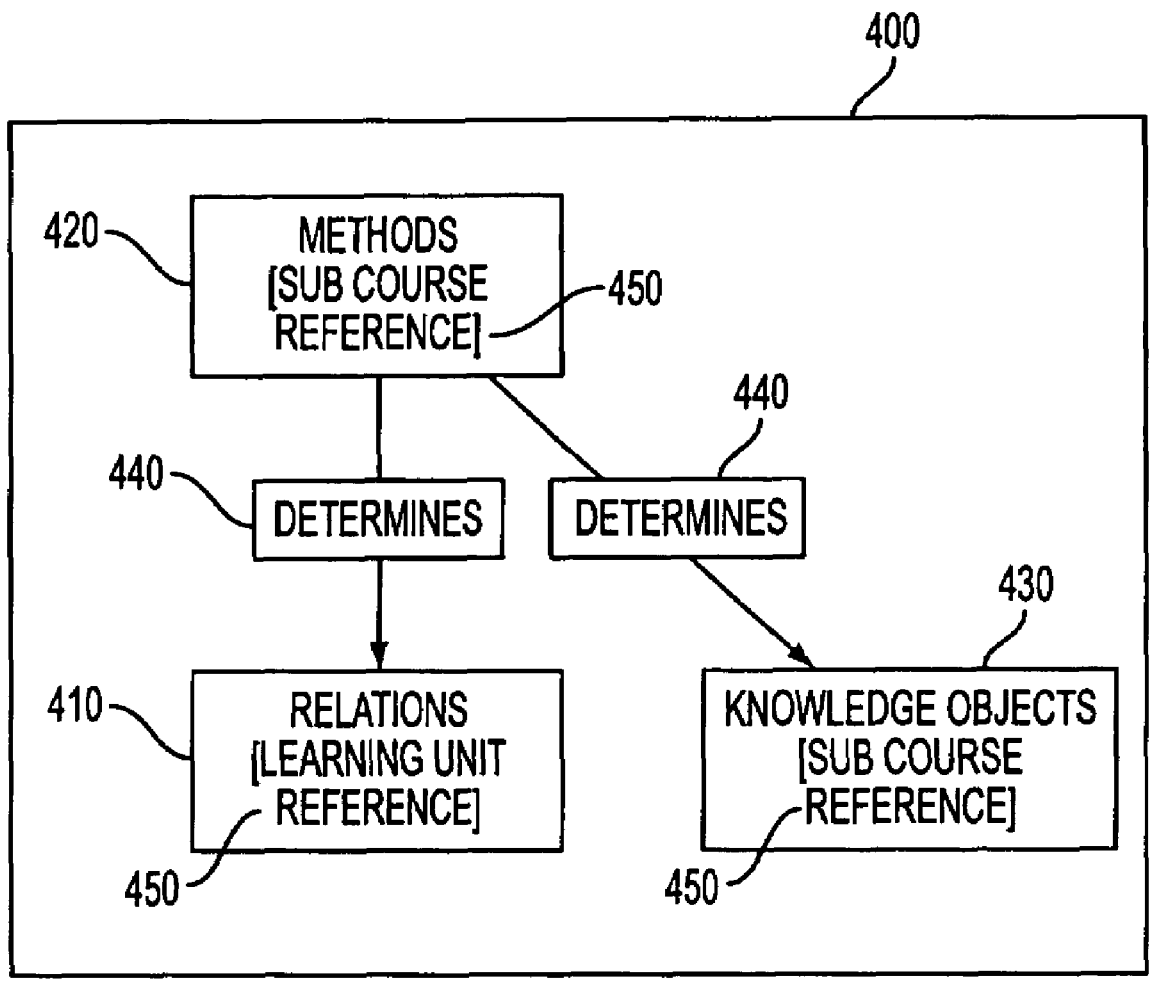
FIG. 4 is an example of a sub-course graph for e-learning.

FIG. 4 shows a graph 400 of the sub-course "Knowledge structure" 350 of FIG. 3. In this example, the sub-course "Knowledge structure" is further divided into three nodes (410, 420, and 430): a learning unit (e.g., on relations) and two sub-courses (e.g., covering the topics of methods and knowledge objects). The edge 440 expressing the relation "determines" has been provided between the structural elements (e.g., the sub-course "Methods" determines the sub-course "Knowledge objects" and the learning unit "Relations.") In addition, the attribute 450 of each node is shown in brackets (e.g., nodes "Methods" and "Knowledge objects" have the attribute identifying them as references to other sub-courses; node "Relations" has the attribute of being a reference to a learning unit).

Figure 5:
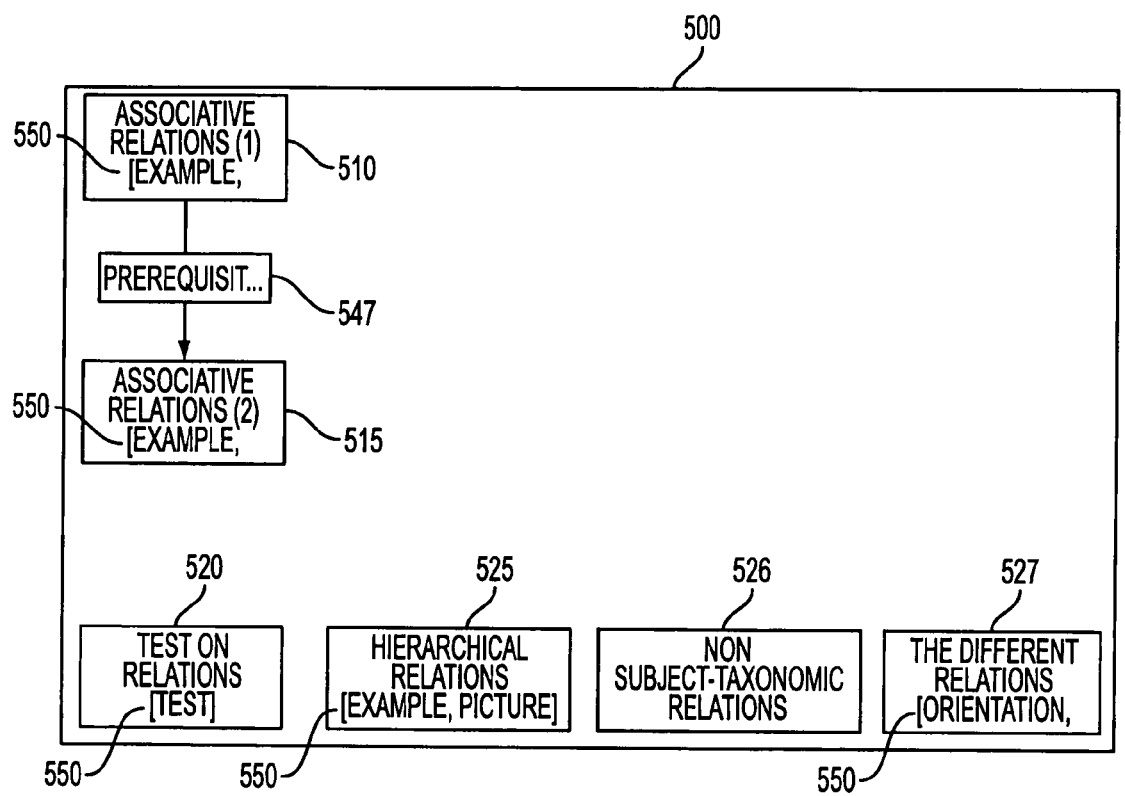
FIG. 5 is an example of a learning unit graph for e-learning.

FIG. 5 shows a graph 500 for the learning unit "Relations" 450 shown in FIG. 4. The learning unit includes six nodes (510, 515, 520, 525, 530, 535, 540, and 545): six knowledge items (i.e., "Associative relations (1)," "Associative relations (2)," "Test on relations," "Hierarchical relations," "Non subject-taxonomic relations," and "The different relations"). An edge 547 expressing the relation "prerequisite" has been provided between the knowledge items "Associative relations (1)" and "Associative relations (2)." In addition, attributes 550 of each node are specified in brackets (e.g., the node "Hierarchical relations" includes the attributes "Example" and "Picture").

E-learning Strategies

The above-described content aggregation and structure associated with a course does not automatically enforce any sequence that a learner may use to traverse the content associated with the course. As a result, different sequencing rules may be applied to the same course structure to provide different paths through the course. The sequencing rules applied to the knowledge structure of a course are learning strategies. The learning strategies may be used to pick specific structural elements to be suggested to the learner as the learner progresses through the course. The learner or supervisor (e.g., a tutor) may select from a number of different learning strategies while taking a course. In turn, the selected learning strategy considers both the requirements of the course structure and the preferences of the learner.

In the classical classroom, a teacher determines the learning strategy that is used to learn course material. For example, in this context the learning progression may start with a course orientation, followed by an explanation (with examples), an action, and practice. Using the e-learning system and methods, a learner may choose between one or more learning strategies to determine which path to take through the course. As a result, the progression of learners through the course may differ.

Learning strategies may be created using macro-strategies and micro-strategies. A learner may select from a number of different learning strategies when taking a course. The learning strategies are selected at run time of the presentation of course content to the learner (and not during the design of the knowledge structure of the course). As result, course authors are relieved from the burden of determining a sequence or an order of presentation of the course material. Instead, course authors may focus on structuring and annotating the course material. In addition, authors are not required to apply complex rules or Boolean expressions to domain models thus minimizing the training necessary to use the system. Furthermore, the course material may be easily adapted and reused to edit and create new courses.

Macro-strategies are used in learning strategies to refer to the coarse-grained structure of a course (i.e., the organization of sub-courses 120 and learning units 130). The macro-strategy determines the sequence that sub-courses 120 and learning units 130 of a course are presented to the learner. Basic macro-strategies include "inductive" and "deductive," which allow the learner to work through the course from the general to the specific or the specific to the general, respectively. Other examples of macro-strategies include "goal-based, top-down," "goal-based, bottom-up," and "table of contents."

Goal-based, top-down follows a deductive approach. The structural hierarchies are traversed from top to bottom. Relations within one structural element are ignored if the relation does not specify a hierarchical dependency. Goal-based bottom-up follows an inductive approach by doing a depth first traversal of the course material. The table of contents simply ignores all relations.

Micro-strategies, implemented by the learning strategies, target the learning progression within a learning unit. The micro-strategies determine the order that knowledge items of a learning unit are presented. Micro-strategies refer to the attributes describing the knowledge items. Examples of micro-strategies include "orientation only," "action oriented," "explanation-oriented," and "table of contents").

The micro-strategy "orientation only" ignores all knowledge items that are not classified as orientation knowledge. The "orientation only" strategy may be best suited to implement an overview of the course. The micro-strategy "action oriented" first picks knowledge items that are classified as action knowledge. All other knowledge items are sorted in their natural order (i.e., as they appear in the knowledge structure of the learning unit). The micro-strategy "explanation oriented" is similar to action oriented and focuses on explanation knowledge. Orientation oriented is similar to action oriented and focuses on orientation knowledge. The micro-strategy "table of contents" operates like the macro-strategy table of contents (but on a learning unit level).

In one implementation, no dependencies between macro-strategies and micro-strategies exist. Therefore, any combination of macro and micro-strategies may be used when taking a course. Application of learning strategies to the knowledge structure of a course is described in further detail below.

E-learning System

Figure 6:
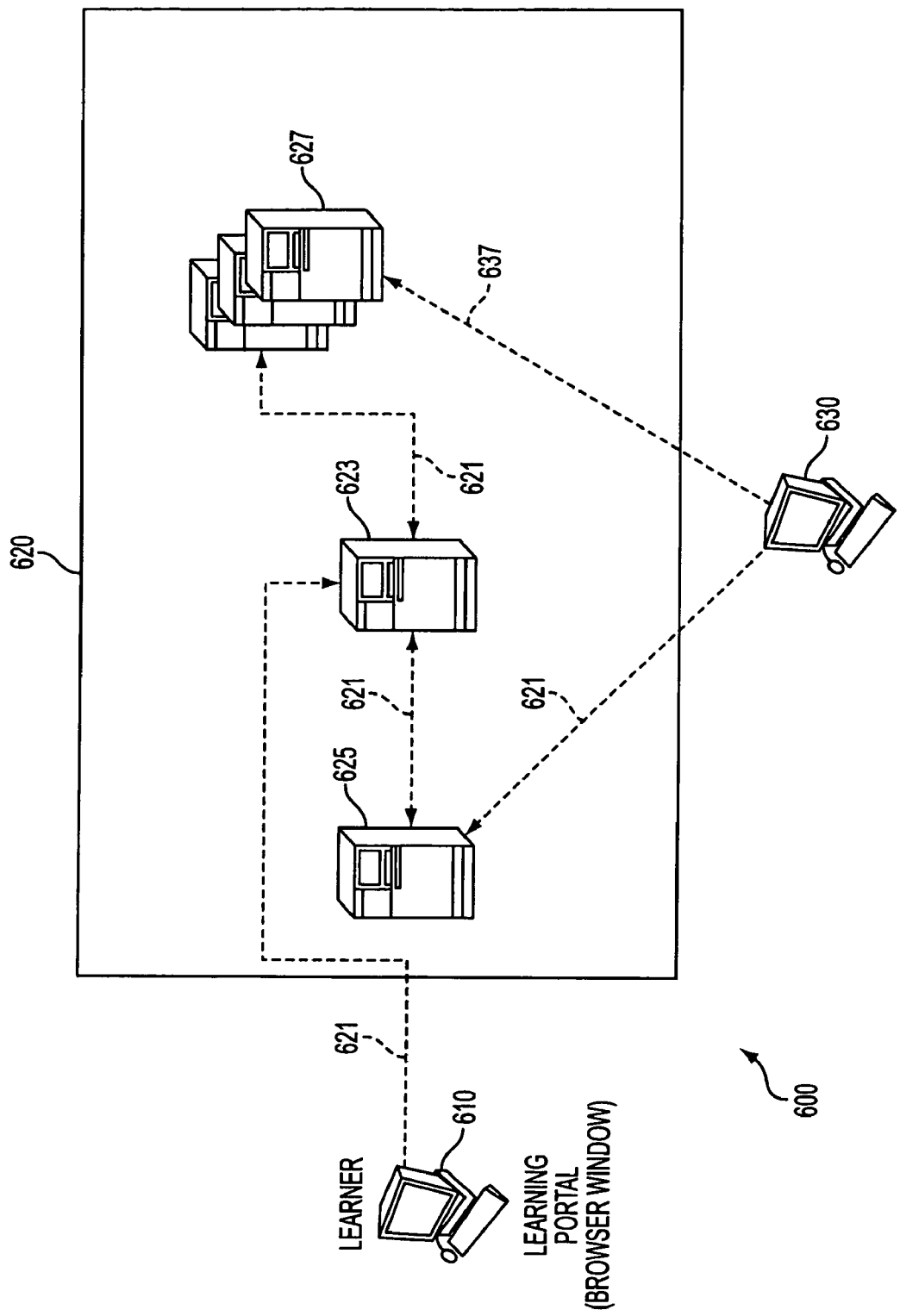
FIGS. 6 and 7 are block diagrams of exemplary e-learning systems.

As shown in FIG. 6, an e-learning architecture 600 may include a learning station 610 and a learning system 620. The learner may access course material using a learning station 610. The learning station 610 may be implemented using any general purpose computer that is capable of executing instructions in a defined manner including: a special purpose computer, a personal computer, a work station, a programmable logic device or a portable computing device. The learning station 610 may execute any number of software applications, including an application that is configured to access, interpret, and present courses and related information to a learner.

The learning station 610 may include a browser to connect with a learning portal that allows a learner to access the learning system 620. A link 621 between the learning station and the learning system 620 may be configured to send and receive signals (e.g., electrical, electromagnetic, or optical) that convey or carry data streams representing various types of analog and/or digital content. For example, the communications link 621 may be implemented using a plain old telephone service (POTS) line network, a digital user line (DSL) network, an integrated services digital network (ISDN), and a synchronous optical network (SONET), or combinations of one or more of these networks. In addition, the communications links may include a wireless link using electromagnetic signals, such as, for example, radio, infra-red, and microwave signals, to convey information. The communications link 621 also may include two or more networks or network devices (e.g., servers, routers, switches, hubs, repeaters, and storage devices).

The learning system 620 may include one or more servers. As shown in FIG. 6, the learning system 620 includes a learning management system 623, a content management system 625, and an administration management system 627. Each of these systems may be implemented using one or more servers, processors, or intelligent network devices. In addition, an authoring station 630 may be provided to create courses from structural elements.

Figure 7:
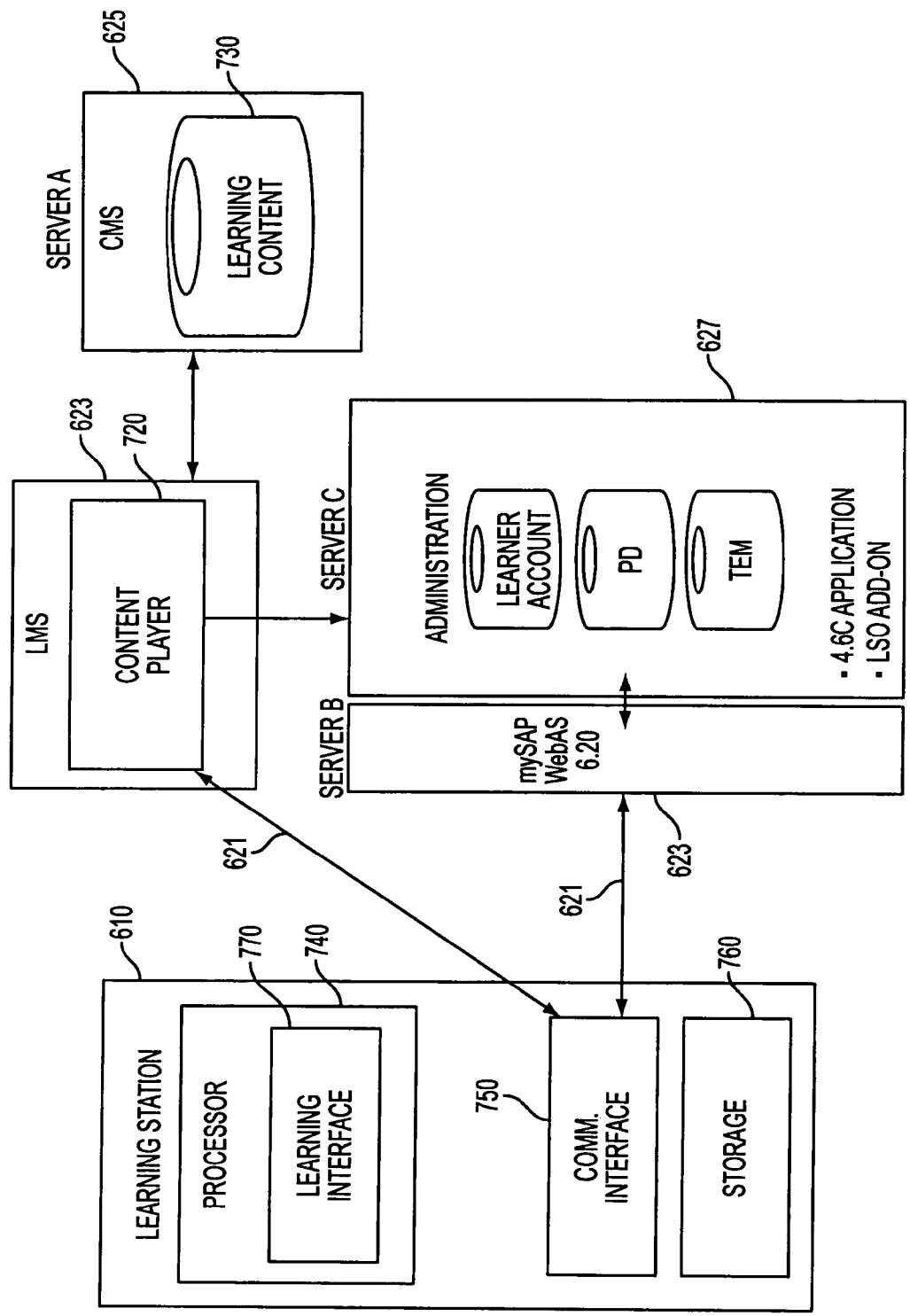

As shown in FIG. 7, the administration management system 627 may be implemented using a server, such as, for example, the SAP R/3 4.6C+LSO Add-On. The administration management system 627 may include a database of learner accounts and course information. For example, the learner account may include demographic data about the learner (e.g., a name, an age, a sex, an address, a company, a school, an account number, and a bill) and his/her progress through the course material (e.g., places visited, tests completed, skills gained, knowledge acquired, and competency using the material). The administration management system 627 also may provide additional information about courses, such as course title, description, courses offered, a course catalog the author/instructor of a course, and the most popular courses.

The content management system 625 may include a learning content server 730. The learning content server 730 may be implemented using a WebDAV server. The learning content server may include a content repository. The content repository may store course files and media files that are used to present a course to a learner at the learning station 610. The course files may include the structural elements that make up a course and may be stored as XML files. The media files may be used to store the content that is included in the course and assembled for presentation to the learner at the learning station 610.

The learning management system 623 may include a content player 720. The content player 720 may be implemented using a server, such as an SAP J2EE Engine. The content player 720 is used to obtain course material from the content repository. The content player 720 also applies the learning strategies to the obtained course material to generate a navigation tree or path for the learner. The navigation tree or path is used to suggest a route through the course material for the learner and to generate a presentation of course material to the learner based on the learning strategy selected by the learner.

The learning management system 623 also may include an interface for exchanging information with the administration management system 627. For example, the content player 720 may update the learner account information as the learner progresses through the course material to indicate, for example, competencies gained, tests passed, courses completed.

Learning Station

The learner may access information about a course, content associated with a course, information about the learning system 620, and information about the learner (e.g., the learner account) using the learning station 610. As shown in FIG. 7, the learning station 610 may include a processor 740, a storage device 750, and a communications interface 760. The learning station 610 also may include any number of peripherals or integrated devices (not shown) (e.g., displays, memory/storage devices, input devices, ports/interfaces, printers, communication interfaces, and speakers) that facilitate access to, presentation of, and interaction with the course, its content, and associated course information.

The processor 740 may be used to implement a learning interface 770. For example, the processor 740 may execute any number of software applications including a learning interface that is configured to access, interpret, and present a course and associated information to a learner, and to allow a learner to interact with the content and the learning system 620.

The learning station 610 may be provided with a number of software applications. The software may include a browser, such as, for example, Netscape communicator, Microsoft's Internet explorer, or any other software application that may be used to interpret and process a markup language, such as HTML, SGML, DHTML, XML, or XHTML. The browser also may include software plug-in applications that allow the browser to interpret, process, and present different types of information. The browser may include any number of application tools, such as, for example, Java, Active X, JavaScript, and Flash.

The communications interface may facilitate the exchange of data and information between the learning station 610 and the learning system 620. For example, the communications interface may be a communications card, a modem, a port, a transceiver or a device that is able to transmit and receive data using the communications link 621. Data may be received from the learning system 620 and processed by the processor 740 and/or stored in the storage 750. Similarly, data processed by the processor 740 and/or stored in the storage 750 may be transmitted to the learning system 620.

As described above, the learner may contact the learning system 620 using the learning station 610 to access a course. The learning interface 770 and associated browser may be used to implement a graphical user interface that accepts information input from the learner and presents information received from the learning system 620. The learning interface 770 also may be provided with a content player to present courses that are downloaded from the learning system 620 to the storage 750.

Offline E-learning

In another implementation of the learning station 610, a learner may take a course offline. Offline course may be processed (e.g., tests, training, and educational content) locally at the learning station 610 without requiring connection to the learning system. The learner may continue training even when the learner is unable to maintain an online connection (e.g., when traveling or when a location has no online access). A local learning state may be stored at the learning station and synchronized with a central learning state stored at the learning system at specified times so that the learner's accumulated knowledge, progress, and processed training is always maintained in a consistent state. As a result, learners are provided with greater flexibility and control over how to plan and manage their training.

Figure 8:
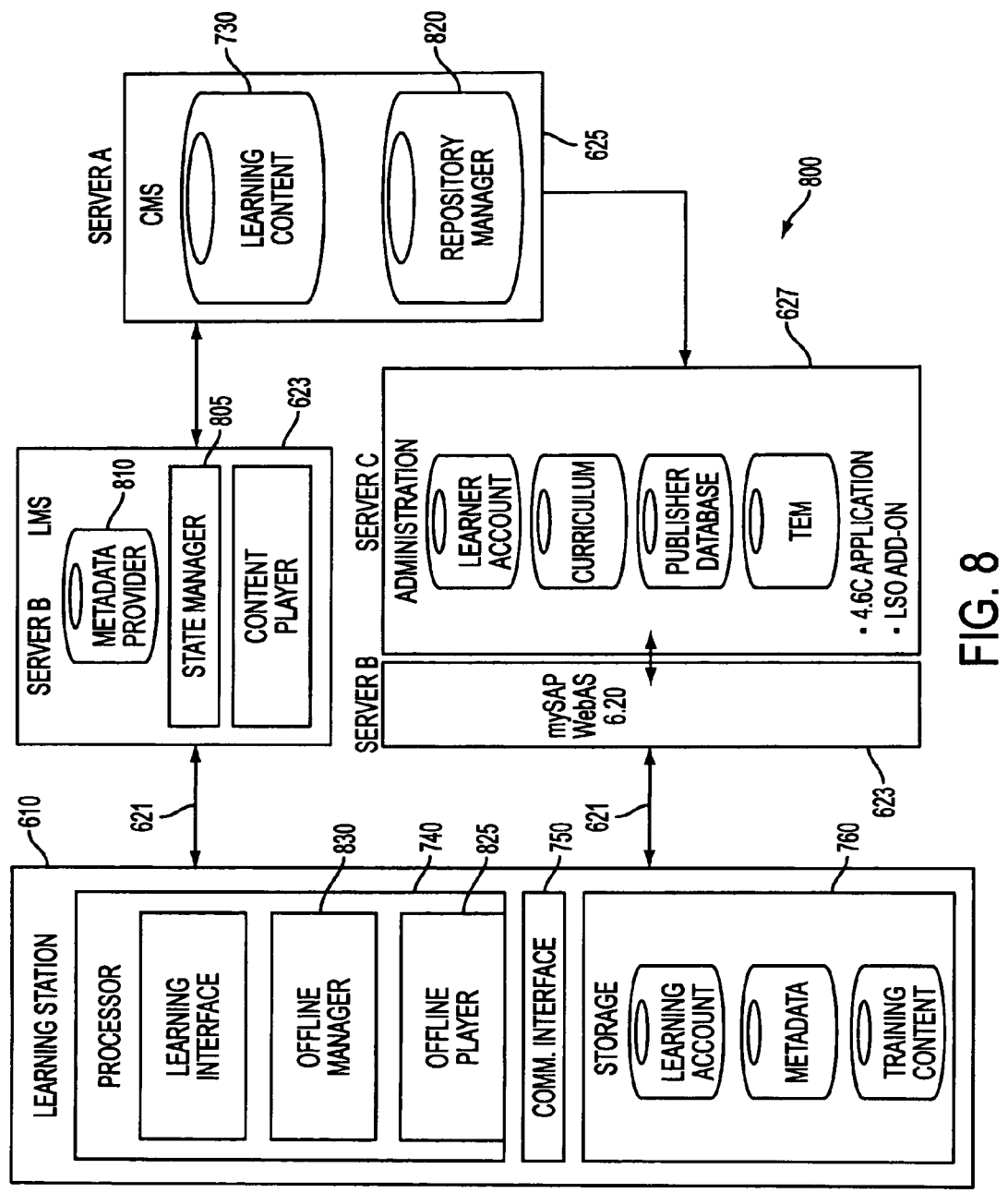
FIG. 8 is a block diagram of an exemplary learning system for offline learning.

As shown in FIG. 8, an offline E-learning system 800 may include a learning management system 623, a content management system 625, and a learning administration system 627. The learning management system 623 may include a content player 720, a state manager 805, and a metadata provider 810. The learning management system 623 also may provide a learning portal that allows the browser of the learning station 610 to communicate with the learning system 800 using the communication link 621. The content management system 625 may include a learning content storage 730 (e.g., the content repository) and a repository manager 820.

As shown in FIG. 8, the learning station 610 may be provided with an offline player 825 and an offline manager 830 that are implemented using the processor of the learning station 610. The learning station 610 also includes a storage 760 for offline data (e.g., an offline learning account, metadata, and courses). The offline player may be used to present course material downloaded from the learning system 800. The offline player operates in conjunction with the learning station 610 browser to present and supervise any offline training. The offline manager 830 interacts with the learning system 800 to properly synchronize the local and central learning course states. The storage of the learning station 610 stores data and files for an offline learning account, offline metadata, and one or more offline courses. An offline manager interface is provided for the learner to interact with the offline manager 830. The offline manager interface may be used to present, manage, and start the offline training using an offline player.

To track the learner's progress while offline, a local course state is saved for any offline course that is presented to a learner. The local course state may be used to keep track of what tests, courses, and structural elements within a course have been viewed or completed. The local course state also may keep track of competencies, qualifications, and proficiencies that are gained or modified from the offline training. The local course state is stored in the offline learning account (e.g., using a TPARTDOC). The local course state may be synchronized at specified times with a corresponding central learning or course state (e.g., stored in the learning account in the learning administration system 627) so that the learner's processed course material is always in a consistent state regardless of whether the course was started online or offline (or if the learner switches between offline and online learning).

For example, a learner may begin a course online and then decide to continue working on the course offline (if the course is offered offline). The learner's central learning state may be stored and synchronized with local course state stored in the offline learning account. Likewise, a learner may work on a course offline and then continue to work on the course online. In this case, before the learner begins to work on the case online, the centralized training state is re-synchronized with the local course state stored in the local learner account. By synchronizing the local course state and the central learning state, the learner may switch back and forth between online and offline training, if desired. The synchronization of the local and central state to maintain consistency of the learner account is described in detail below.

Creating an Offline Course

Offline courses are derived from the published on-line courses. A curriculum manager may determine which content and courses may be provided offline. An indication (e.g., a flag, an ID, a signal, or a token) may be added to the course catalog of the learning administration system 627 to indicate if a course also is offered offline. A reference to a generic packaging list including learner independent metadata for the offline course also may be associated with the course. Any courses that are indicated as being offered offline by the course catalog may be booked by a learner using the learning interface. If a learner chooses to take a course offline, the course material is assembled and downloaded to the learning station 610 along with learner specific information, as described in detail below.

A copy editor may create offline courses from published courses offered online using the repository manager 820. The repository manager 820 may be used to create the generic packaging list associated with the course that is offered offline. The generic packaging list includes access paths and learner independent metadata of all files that are part of the offline course that are not learner specific. For example, the generic packaging list may be used to indicate the content files that are downloaded to the learning station 610 to allow the learner to take the course offline.

Additional metadata that is specific to the learner and the offline course are derived from centrally administered learner specific metadata stored in the learner account. The learner specific metadata is used to create a learner specific packaging list once the learner decides to take the course offline, as described in further detail below.

Figure 9:
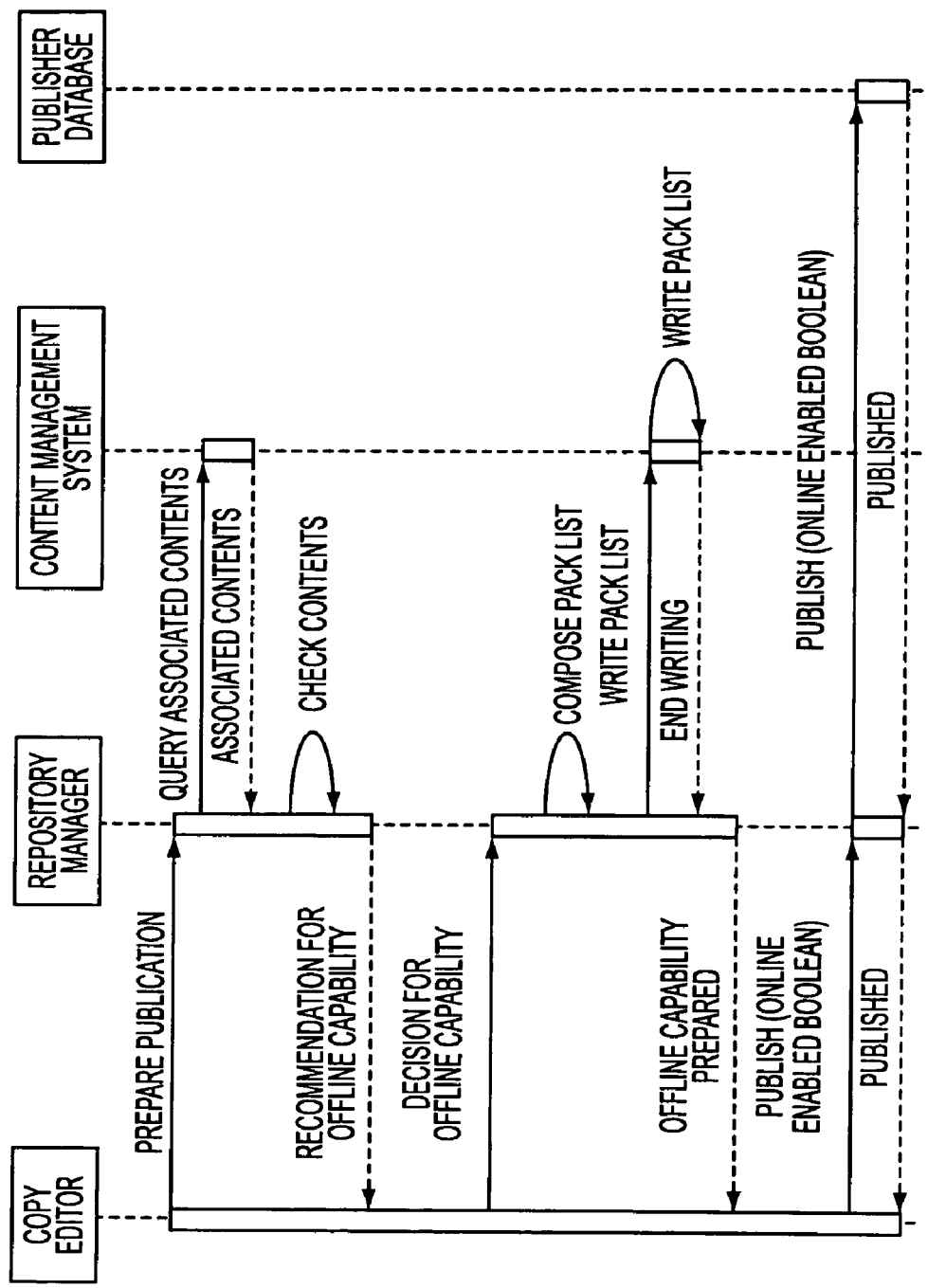
FIG. 9 is an exemplary process for creating an offline course.

In one implementation, an offline course may be created as shown in FIG. 9. The copy editor may decide to create an offline offering of a course at the time of publication of the course. In order to offer a course offline, the copy editor accesses the repository manager 820 to query the content repository of the content management system 625 and determine what content is associated with the course. Using the content identified in the content repository, the repository manager 820 may perform a test to determine whether all of the structural elements of a course are available on the content management system 625 (e.g., in a distributed system that includes more than one content management system 625, it is possible for individual structural elements or access paths of structural elements to be located on external servers).

Based on the results of the test, the copy editor may decide whether the course is suitable to be offered offline. If the copy editor determines that the content is suitable to be offered offline (e.g., all of the structural elements associated with the course are available to be packaged in a file for offline use), the repository manager 820 creates the generic packaging list for the course. After creating the generic packaging list, the repository manager 820 writes the generic packaging list associated with the offering of the course offline to the content repository. Once the generic packaging list has been stored in the content repository, the repository manager 820 notifies the copy editor, and the copy editor instructs the repository manager 820 to publish an indication, such as a flag, that the course is offered offline in the publisher database (e.g., a course catalog) of the learning administration managing system 627. A reference to an access path for the generic packaging list is included in the publisher database during publishing.

Downloading Offline Course

Figure 10:
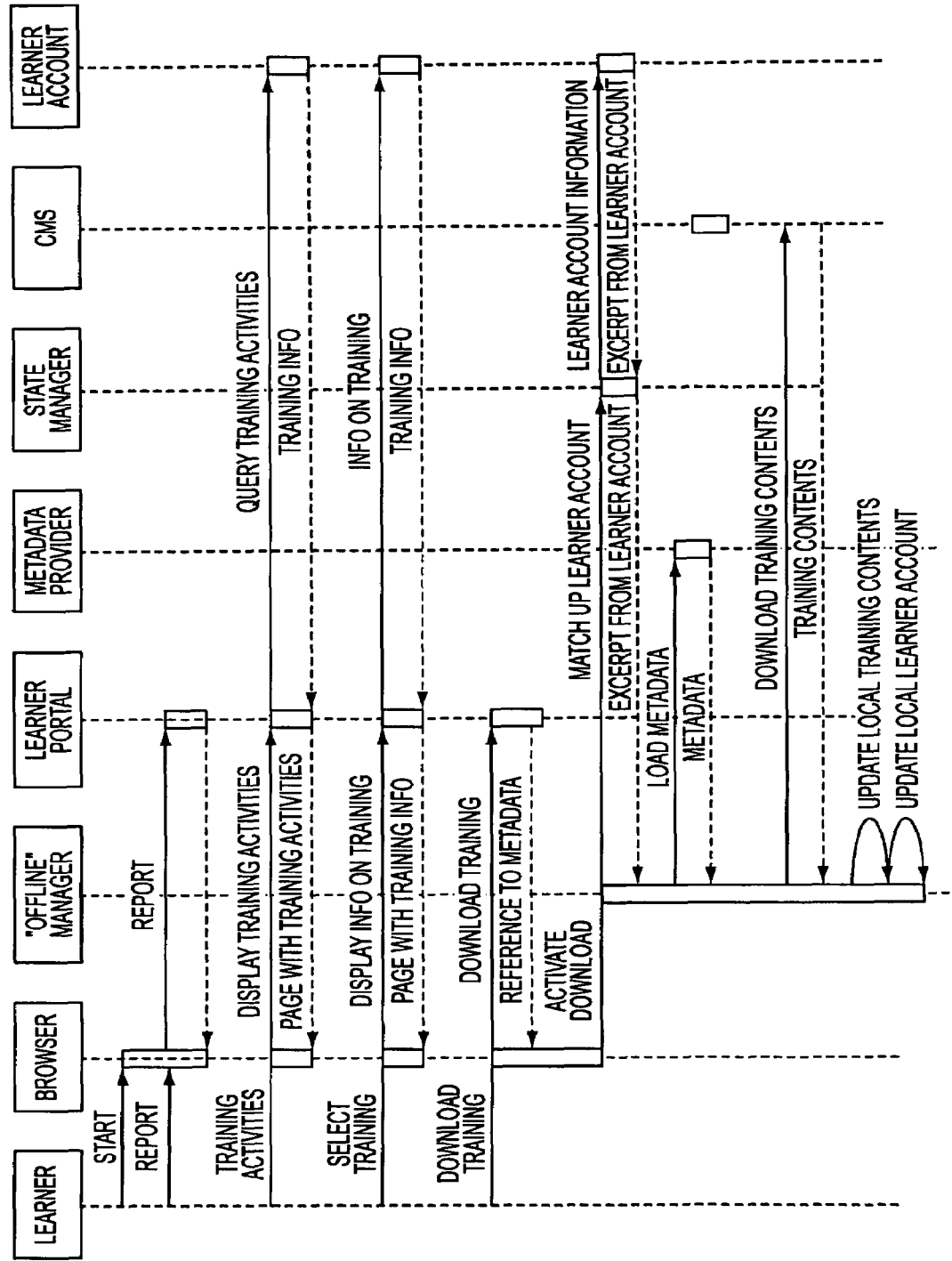
FIG. 10 is an exemplary process for downloading an offline course.

FIG. 10 shows one exemplary process to download a course for offline training. The learner starts the browser and learning interface of the learning station 610. Once started, the learner may request that the learning interface connect to the learning system 620 (e.g., log on to the learning system 620). The learning management system 623 provides the initial course screen of the learning interface. Using the learning interface, the learner may determine if a course is offered offline (e.g., the learner may search for a course using a course catalog or the find feature from a navigation window).

If the course is offered offline, the learner may select the course from a training activities window, the course catalog, or other navigation window of the learning interface in the same manner that learner would select an online course. In addition, the learner may view information about the course. For example, the browser may submit a request for information corresponding to the offline course to the learning management system 623. The learning management system 623 queries the learning administration system 627 to obtain the training information from the published database. The learning management system 623 returns a page with the relevant course information for display by the learning interface.

The learner may select the offline course using, for example, a hyperlink provided by the learning interface. Selecting the offline course (e.g., selecting the hyperlink) causes the browser to contact the learning management system 623 to determine a reference to the access path or generic packaging list associated with the course stored in the administration management system 627. The access path to the offline course is returned to the browser. The access path may be encoded as a special data type (e.g., a MIME type) that causes the browser to activate the offline player and manager 830.

To begin downloading the offline course, the offline manager contacts the metadata provider of the learning management system 623 using the access path for the offline course (e.g., a URL) including information about the generic packaging list. The metadata provider accesses the learner account to obtain learner specific information or metadata including a course.

The metadata provider 810 merges the generic packaging list with the learner specific metadata and returns a learner specific packaging list to the learning station 610. For example, the learner specific packaging list may consist of a macro/micro strategy preferred by the learner, the TPART-DOC (explained below), and a resource reference.

The meta-information in the learner specific packing list is coded as a special data type (e.g., a MIME type for which the offline manager 830 may be registered automatically when installing the offline manager 830 or set manually by the user when first downloading this data type). In response to receiving the special data type from the metadata provider 810 the offline manager 830 copies all necessary information to the learning station 610 by interacting with the content management system 625. Using the learner specific packaging list, the offline manager 830 accesses the content management system 625 to download the course content files specified by the learner specific packaging list associated with the offline course. The content files and any resources of the course are copied to the local storage of the learning station 610 successively and may be compressed, for example, using a zip file or any other format suitable for storing and compressing segments of a file system. This process may be repeated to download multiple offline courses.

The offline manager 830 also manages synchronization of the local and central course states in addition to the learner's local and central account information. The central learning account information and the local learning account information may be synchronized if appropriate as explained below.

Learning Account Synchronization

Figure 11:
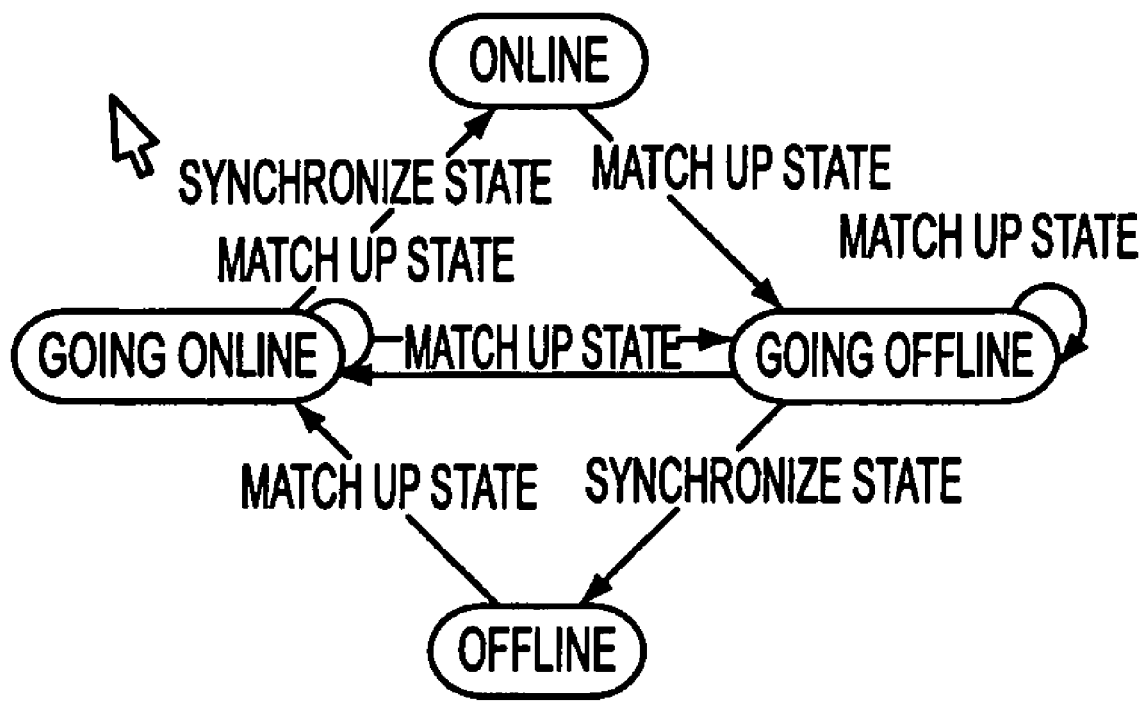
FIG. 11 is an exemplary state model for offline learning.

As shown in FIG. 11, the local and central course states are managed using four states: "online," "offline," "going offline," and "going online." The "online" and "offline" states are initiating or end states; the "going offline" and "going online" states are transitional states. To manage the learner's processing of the course material and consistency of the learner account data, the state transitions shown in FIG. 11 are used to ensure that no inconsistency between the local and central states exist if any errors in processing of the course occur (i.e., to prevent any disagreement between the processing state of the learning system 800 and the learning station 610).

The "offline" state indicates the course can be or is currently being processed offline (i.e., by the learning station 610). The "online" state indicates the course can be or is currently being processed online (i.e., by the learning system 800). The learner may initiate a change in state from either of these two states. In addition, completion of a state transition should end in one of these two states.

Two transition states are used to switch between the online and offline states. The state "going offline" indicates the course should switch to the offline processing state. The state "going online" indicates the course should switch to the online processing state. The transition states are temporary states after a synchronization protocol step has been completely and correctly executed, and should not occur as initial or end states. During the execution of the synchronization protocol the processing state must be in one of these two transition states.

Using these state transitions, an exemplary execution sequence of the transition from online to offline is shown in the following table:

| Step | Action | State Transition (Result) |
| --- | --- | --- |
| 1 | Learner portal: switch training state | |
| 2 | Learner account: note state switch | Centrally: online → "going offline" |
| 3 | Learner portal: initiate data match-up | |
| 4 | Offline Player: activate data match-up | |
| 5 | Offline Player: note state switch | Locally: online → "going offline" |
| 6 | Offline Player/State Manager/learner account: synchronize state | |
| 7 | Offline Player: execute state switch | |
| 8 | Learner account: state switch | Centrally: "going offline" → offline |
| 9 | Offline Player: state switch | Locally: "going offline" → offline |

The state transitions are executed once their associated actions have been successfully performed. If a processing error occurs during the transitions, the learning station 610 may proceed in a specified manner that preserves the consistency of the learner account. For example, if the central state is switched to "going offline," and the local state remains at "online," the course can still be processed online (but not offline). To proceed offline, the learner must initiate the switch to offline a second time.

If the central state and local state are both "going offline," the course may no longer be processed. To take the course offline, the learner must initiate the switch to offline a second time.

If the central state is switched to "offline," and the local state remains in the state "going offline," the course may no longer be processed. In this case, two state switches are necessary to proceed. First, the course must be (temporarily) switched back to the "online" state before another attempt can be made to switch to the "offline" state.

Similar situations arise in the switch from "offline" to "online." For example, the central state is switched to "going online," while the local state remains at "offline." As a result, the course may proceed offline (but not online). If both states are at "going online," the course can no longer be processed. If the central state is switched to "online," while the local state remains at "going offline," the course can be processed online now (because this situation can only occur after the training state has been synchronized and a consistent state is also assured in this case.) An additional error correction is provided because it is always possible to switch to the online mode at the risk that the local state and associated local course and learner data are lost.

The course state is administered as part of the learner account. To match up the learning system and learning station learner account databases, the differences between the two learner account databases must be transmitted from one database and received by the other database.

Figure 12:
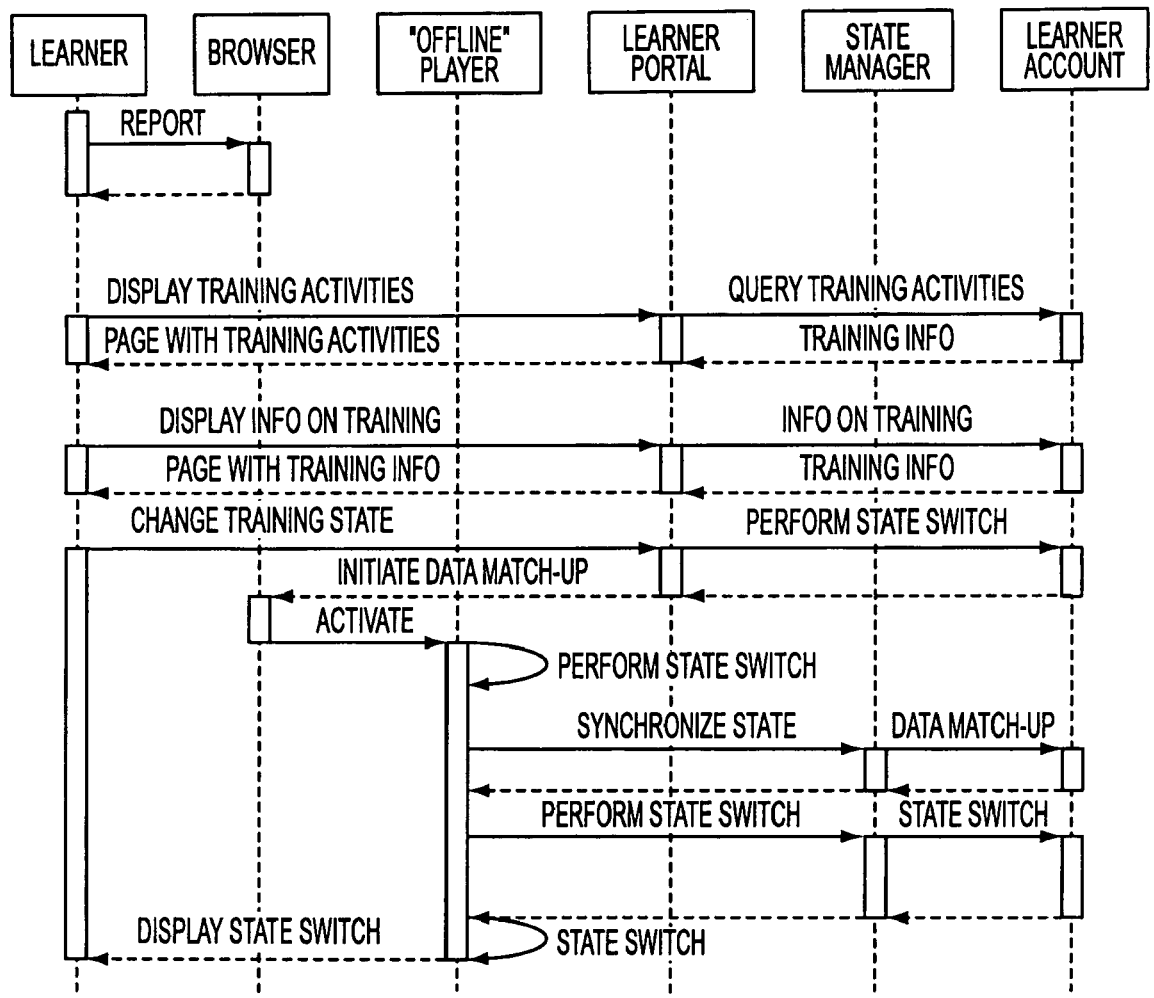
FIG. 12 is an exemplary process for synchronizing the training state of a learner.

FIG. 12 shows an exemplary synchronizing sequence course sequence diagram. When a learner wishes to go offline, the learner provides an indication to the learning portal to switch the course state for that learner. The learning portal updates the central state in the learner account from "online" to "going offline." The portal initiates a data match-up and provides a URL to the learning station's browser. The browser recognizes the file type for the match-up data as being for the offline player and activates the offline player. The offline player notes the state switch and changes the local state from "online" to "going offline." After the state switch, the offline player and state manager synchronize states and the local learner account synchronizes with the central account. The offline player then executes a state switch. The state manager contacts the learner account to switch the central state from "going offline" to "offline." If the state manager indicates the switch was successful, the offline player then switches states from "going offline" to "offline." Once offline, the offline player allows the learner to access/take the course with the user interface.

If an error occurs during the transfer process, the course remains locked (even if the content and/or learner information is downloaded to the offline player) and the offline player does not allow the learner to access the course.

A similar procedure is used to go back online. When a learner wishes to go online, the learning station connects to the learning system to update the user's status to "going online." The learning system provides a URL to the learner's browser. The URL directs the learner's browser to contact the state manager. The browser switches from "offline" to "going online." The state manger returns a file for the necessary learner information that is used to update the learner's account. The browser recognizes the file type as being for the offline player. The offline player contacts the state manager and provides the learner specific information. The state manager updates the learner account information. Once done the offline player indicates the transfer complete and, if the transfer is successful, the state manager updates the status to "online."

Course Processing

Figure 13:
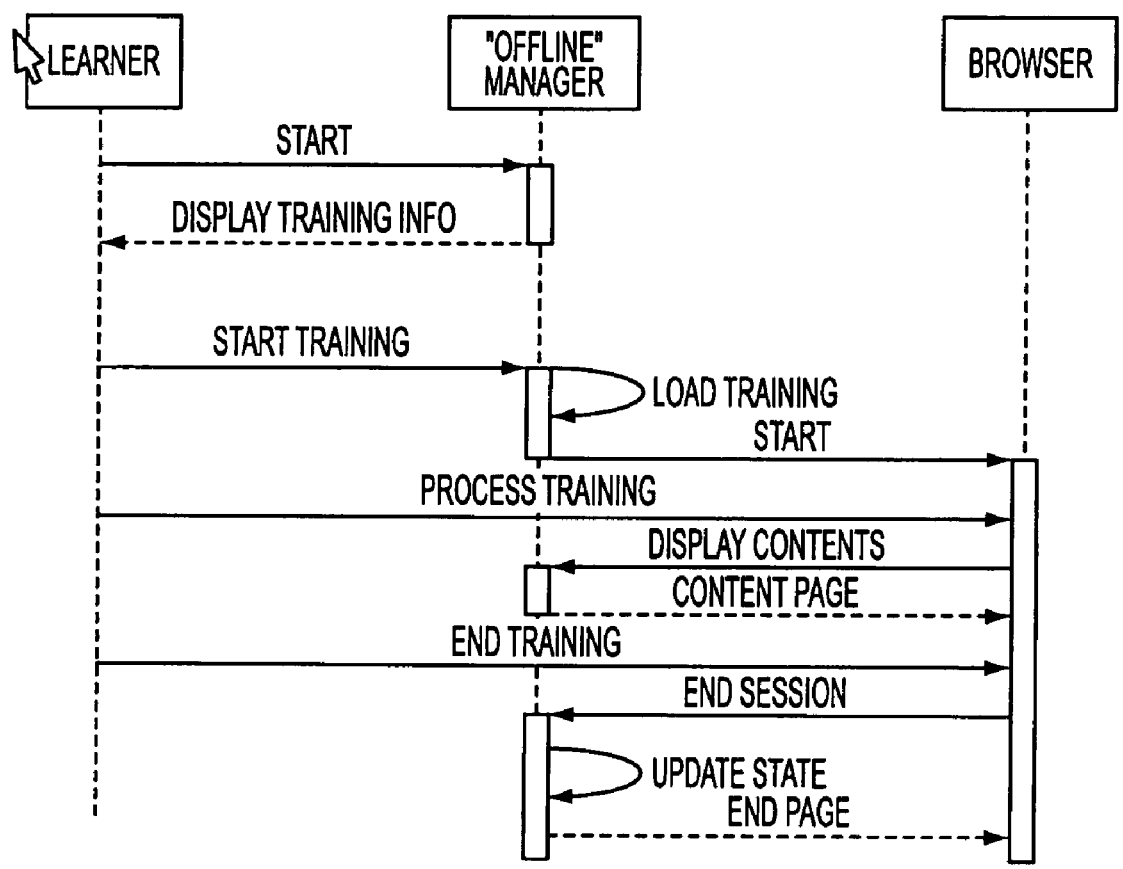
FIG. 13 is an exemplary process for processing an offline course.

A process for offline training in shown in FIG. 13. In the offline mode, the offline manager 830 takes on both the function of the learning management system 623 and the content player 720. The offline manager 830 is provided with an appropriate version of a content player to play the course in the offline mode. The offline content player may be used to present the course to the learner in addition to applying a selected learning strategy in the same manner that a learner would be presented with a course online.

For example, the offline manager 830 displays the list of the available offline courses using the offline manager user interface. The learner may select a course from the course list displayed by the offline manager user interface. After selection and activation of the course, the content is loaded in an updated processing state. The browser is launched with the updated content resource. Processing occurs parallel to the online mode, i.e., the learner uses the browser-based learning interface in the same manner with which he or she is familiar for taking online course. The content is displayed by the learning interface and the learner interacts with the course. When the offline training session ends, the offline manager 830 may update the local training state as the learner interacts with the course.

The offline manager 830 controls the coordination of several embedded components, for example, a download manager, a synchronization manager, an offline storage manager, and an offline content player. Under some circumstances, the embedded components, e.g., a download manager that is in charge of downloading course content files, executes long-term actions, such as the download of course content files. In such cases, the system must provide visible feedback to the learner informing her that such a long-term action is currently executed (e.g., by displaying an information dialog with a progress bar). The embedded components, however, do not implement these user interface related feedback functions themselves, but rather use a programmatic interface for which the offline manager 830 provides the appropriate implementation. From that point of view, all user interface related interactions are implemented in the offline manager 830.

The offline storage manager provides the course listing, which may include all locally stored courses and manages the metadata for each course. For example, the offline storage manager determines and tracks which courses are currently locked, i.e., which are currently viewed online and thus cannot be started offline, which courses have been completely downloaded, and which courses are closed (e.g., the learner has decided to not use them in offline mode any longer and, thus, are safe for deletion).

Course content and associated metadata downloaded for the offline course may be stored at the learning station 610 in compressed or packed form. The downloaded course content is accessed by the offline content player to present the course to the learner.

As described above, metadata is stored at the learning station 610 for each course to ensure the conformity between local training state of the course and the learner's account and the central (e.g., online) training state of the course and the learner's account. For example, the training participation document (TPARTDOC or TPARTID) includes an Id that uniquely identifies a learner for a booked course. The TPARTDOC also is used to help conform the offline session with the central learning account and online sessions. Metadata is also used to control the presentation of the course to the learner by the offline content player (e.g., specifying a learning strategy to use to present the course).

Figure 14:
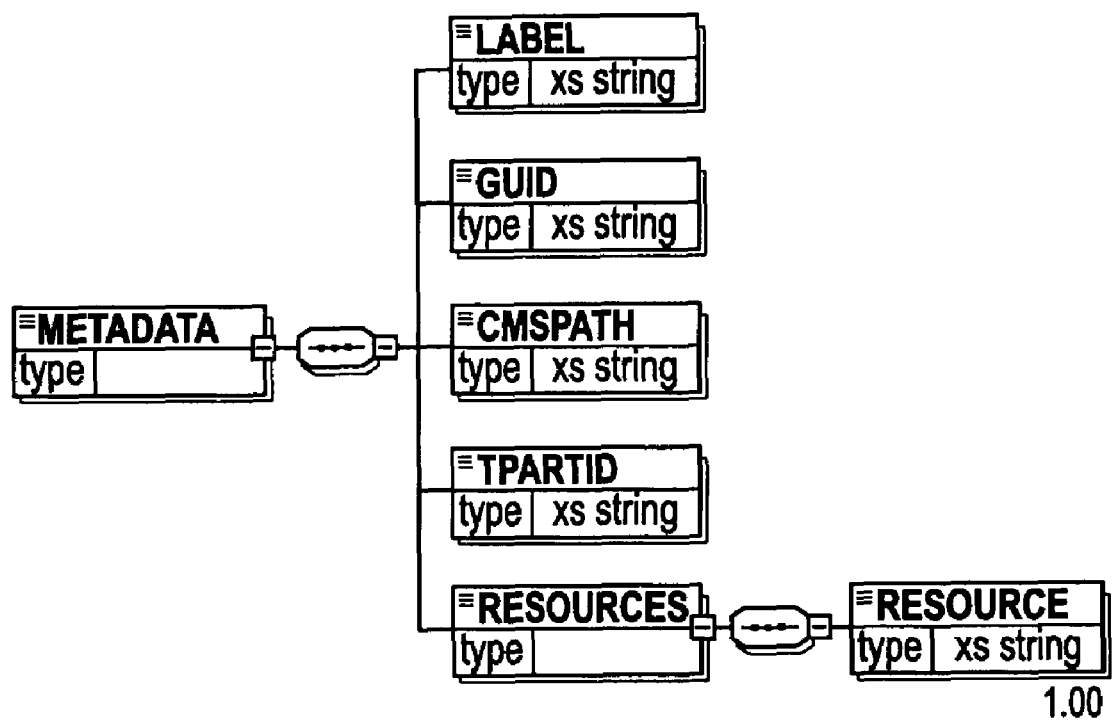
FIG. 14 is exemplary learner independent metadata for offline training.

The metadata may be divided into two groups: learner-specific and learner-independent. The learner-independent data is used to form the generic packaging list. As shown in FIG. 14, the learner-independent metadata may include: a LABEL, a GUID, a CMSPATH, RESOURCES, and RESOURCE.

The LABEL contains the offline course title. The title may be used by the offline manager 830 to display a course in the list of available offline courses.

The GUID contains the publication GUID of the course material, which assigns it to a course in the course catalogue. The GUID may be used to uniquely identify the location where the content and resources for the offline course are stored (e.g., by including the GUID in the name of the ZIP file provided to the learning station).

CMSPATH saves the access path to the "anchor object" of the course, which is loaded when the learner starts viewing that course.

RESOURCES is the list of resources (course or content resources), which are required for processing the course in the offline mode. The base URL of the content management system 625 is stored in the base attribute. RESOURCE contains information on an individual resource. The relative URL specifies the location of the resource in the content management system 625. When downloading a resource, the download manager computes the full access path by appending the relative resource URL to the base URL of the content management system 625. The size (in bytes) can be shown in the attributes size and the resource data type as mime-type.

Figure 15:
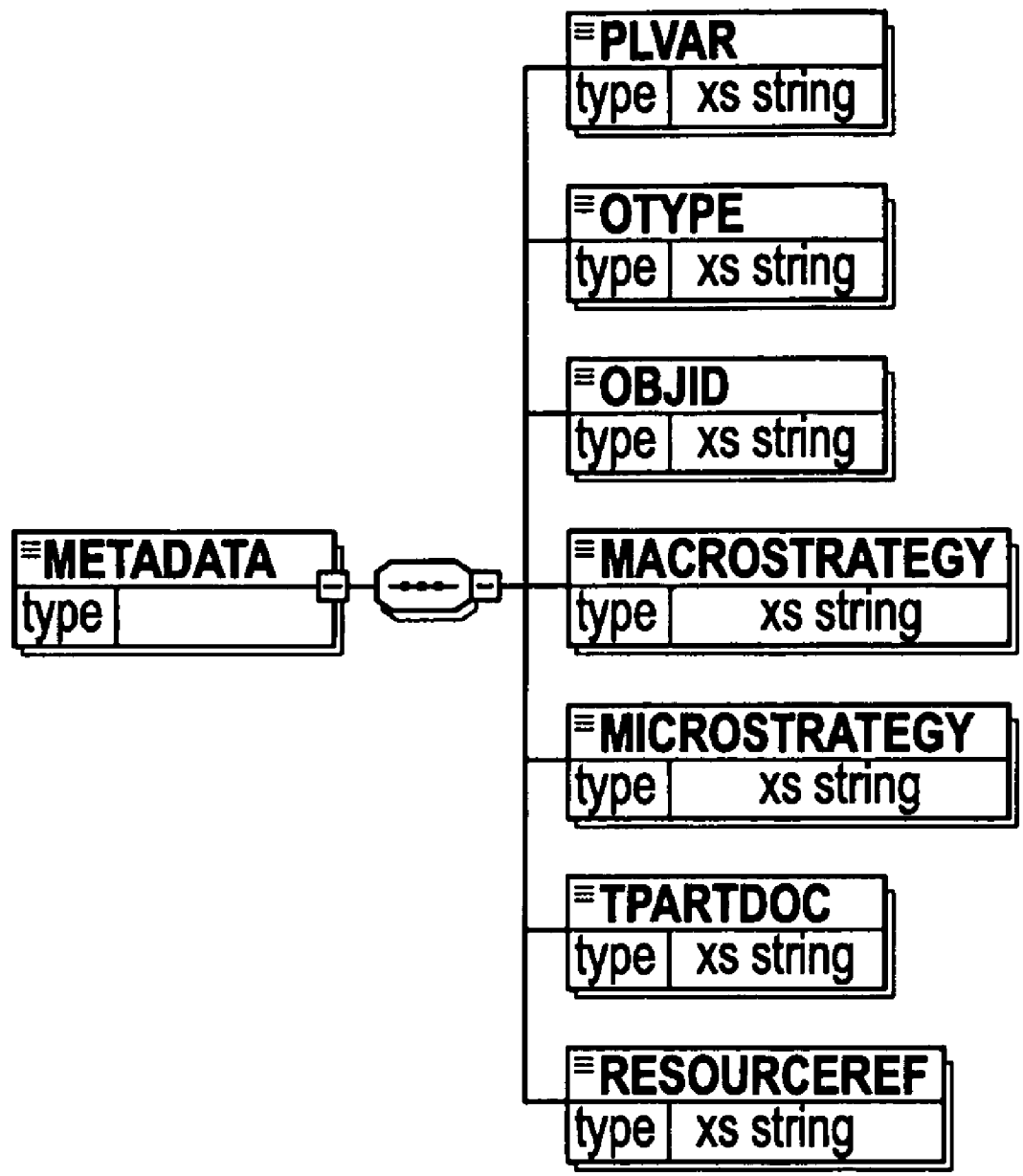
FIG. 15 is exemplary learner specific metadata for offline training.

As shown in FIG. 15, the learner-specific elements of metadata include a PLVAR, OTYPE, OBJID, a TPARTDOC, a MACROSTRATEGY, a MICROSTRATEGY, and a RESOURCEREF. PLVAR, OTPYE, and OBJID form a triple that uniquely identifies the learner in the learning administration system. The TPARTDOC serves for retrieving the training information from the learner account (e.g., completed items, completed tests, scores, qualifications, competencies, proficiencies, and goals), which may be used to ensure conformity between the central database for a learning account and the offline learning account. The MACROSTRATEGY identifies any macro-strategy, which is to be used for the processing of the offline course. The MICROSTRATEGY identifies any micro-strategy, which is to be used for the processing of the offline course. The learning strategies may be applied to the course in the same manner as applied by the content player 720 of the learning management system 623. The RESOURCEREF contains a link to the learner-independent package list. This link is generated by the meta-data provider during the process of generating the learner specific package list and serves as a back reference to the original generic package list.

Learner Interfaces

FIGS. 16–19 show a learner interface for use with online and offline learning. The learning interface may be used to search a course catalog, book and cancel course participation, and support individual course planning (e.g., by determining qualification deficits and displaying a learner's completed, started, and planned training activities). The learner also may access and work through web based courses using the learning interface. The learning interface may be used to start a course, reenter a course, exit a course, and take tests. The learning interface also provides messages, notes, and special course offerings to the learner.

A personalized learner account is stored by the learning administration system. The learning management system uses the account information to prepare displays for the learner and to facilitate the learner's interaction with the learning system. The learner account includes information about training activities (e.g., completed, in process, and planned course), course prebookings, a notebook, qualifications, qualification match-ups, and a preferred learning strategy. The learning interface may be used to view and to interact with the learner account information.

Figure 16:
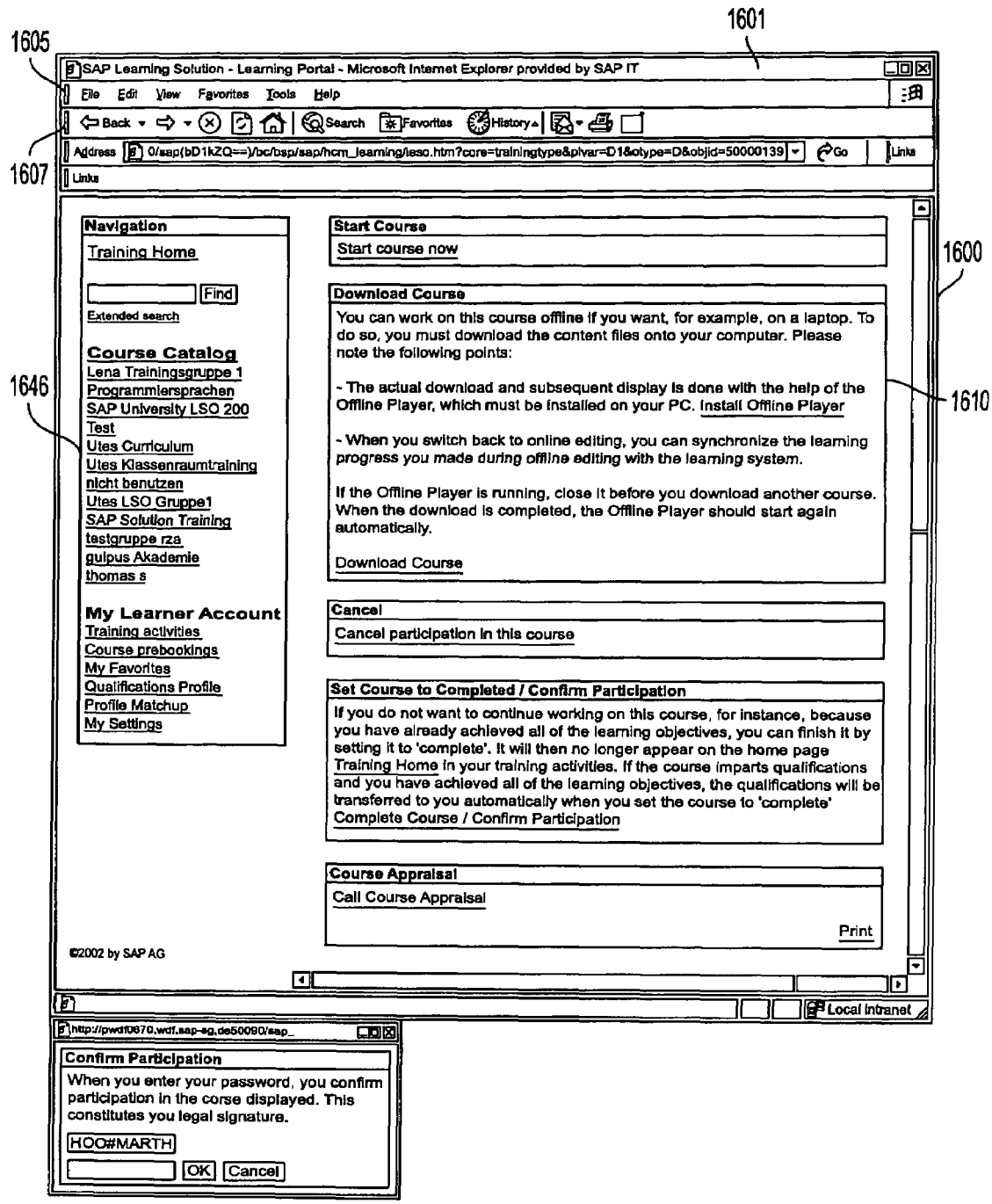
FIGS. 16–19 are examples of a learning interface.

FIG. 16 shows a learner interface screen 1600 that is presented by the learner interface. The screen 1600 may include a title bar 1601, a menu bar 1605, and a tool bar 1607. In addition, the screen 1600 may include a number of windows including course window 1610 and a navigation window 1640.

The navigation window 1640 may be used by the learner to navigate through the various information sets that are provided by the learning system. The navigation window 1640 may include a hyperlink to a home page (e.g., the initial screen), a find field, a course catalog hyperlink and various learner account hyperlinks.

The course window 1610 includes a hyperlink to start a course, download a course, cancel participation in the course, complete or confirm participation, and give a course appraisal. The user also may select a hyperlink to install the offline player from the learning system to the learner station.

If the learner selects training content from the course catalog (e.g., in the navigation widow) the possible operations (download, start, cancel) are made available based on the current state (using the hyperlinks).

In addition, learners can change their local settings (e.g., proxy settings for download and synchronization Managers). All other operations are implicitly initiated and normally require no direct interaction with the user, aside from the state and progress displays.

The download course section provides a user with an explanation of that the selected courses may be processed offline and that the learner must transfer all the training content files to their learning station.

In addition the learner is reminded that the actual download and the subsequent display are performed with the aid of the Offline Player. Therefore, the application must be installed on the learning station.

When a learner clicks on the "download training" link, first the synchronization state in the learning administration system 627 is changed to "going offline." The learning administration system 627 is then requested to transmit the learning progress and the content files locally to the learner's computer. If the content files are already on the computer, only the learning progress is matched. After the content files have been successfully downloaded, the Offline Player changes the state in the learning administration system 627 Offline (as explained above).

Figure 17:
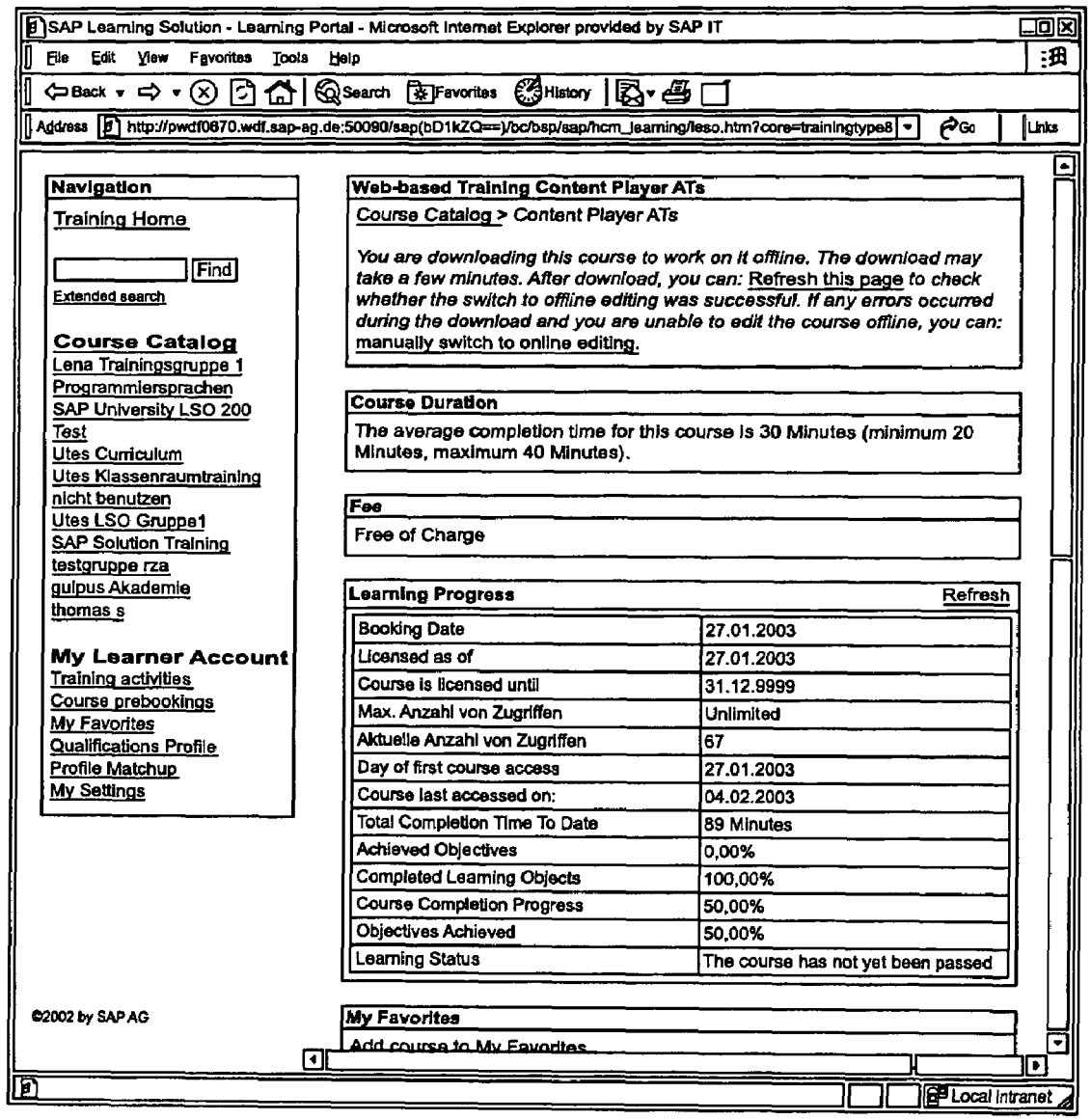

As shown in FIG. 17, if the learner decides to take the course offline, a message is displayed "You can download this training for offline processing. This may take several minutes. After downloading, you can refresh this page to check whether the switch to offline processing was made," for example using the refresh page hyperlink or button (e.g., on the tool bar). If an error occurs during downloading, the learner can switch to online processing manually by selecting the manually switch to online editing hyperlink.

When a learner clicks on "refresh this page," the page is reloaded from the Web Application Server. If the state transition has functioned properly, the training is in the offline state.

If a learner selects the hyperlink "switch to online processing manually" hyperlink because they feel that an error has occurred during downloading, learner portal sets the state in the back end back to "online," thus aborting all state transition activities.

Figure 18:
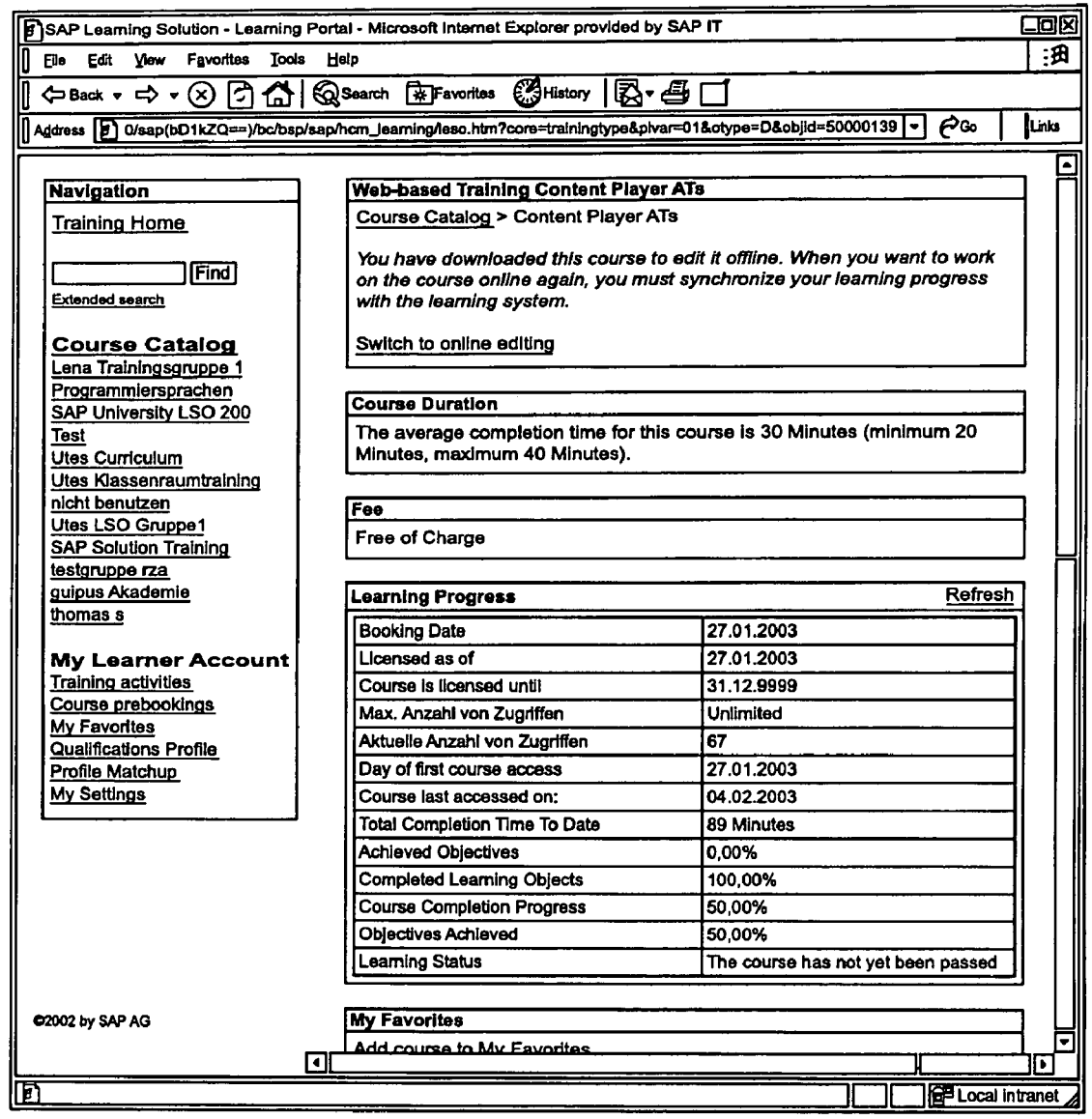

As shown in FIG. 18, after successfully going "offline," the learner may be presented with a message "You have downloaded this training for offline processing. To permit online processing of the training again, the learning progress achieved must be matched to the learning system. If you have processed the training entirely offline, you must change to online processing so that the learning progress is transferred to the learning system," and a hyperlink to switch to online processing.

If the learner selects the "switch to online processing" hyperlink, first the state is changed to "going online," and then the Offline Player is requested to synchronize. Following successful synchronization, the state of the Offline Player is changed to "online."

Figure 19:
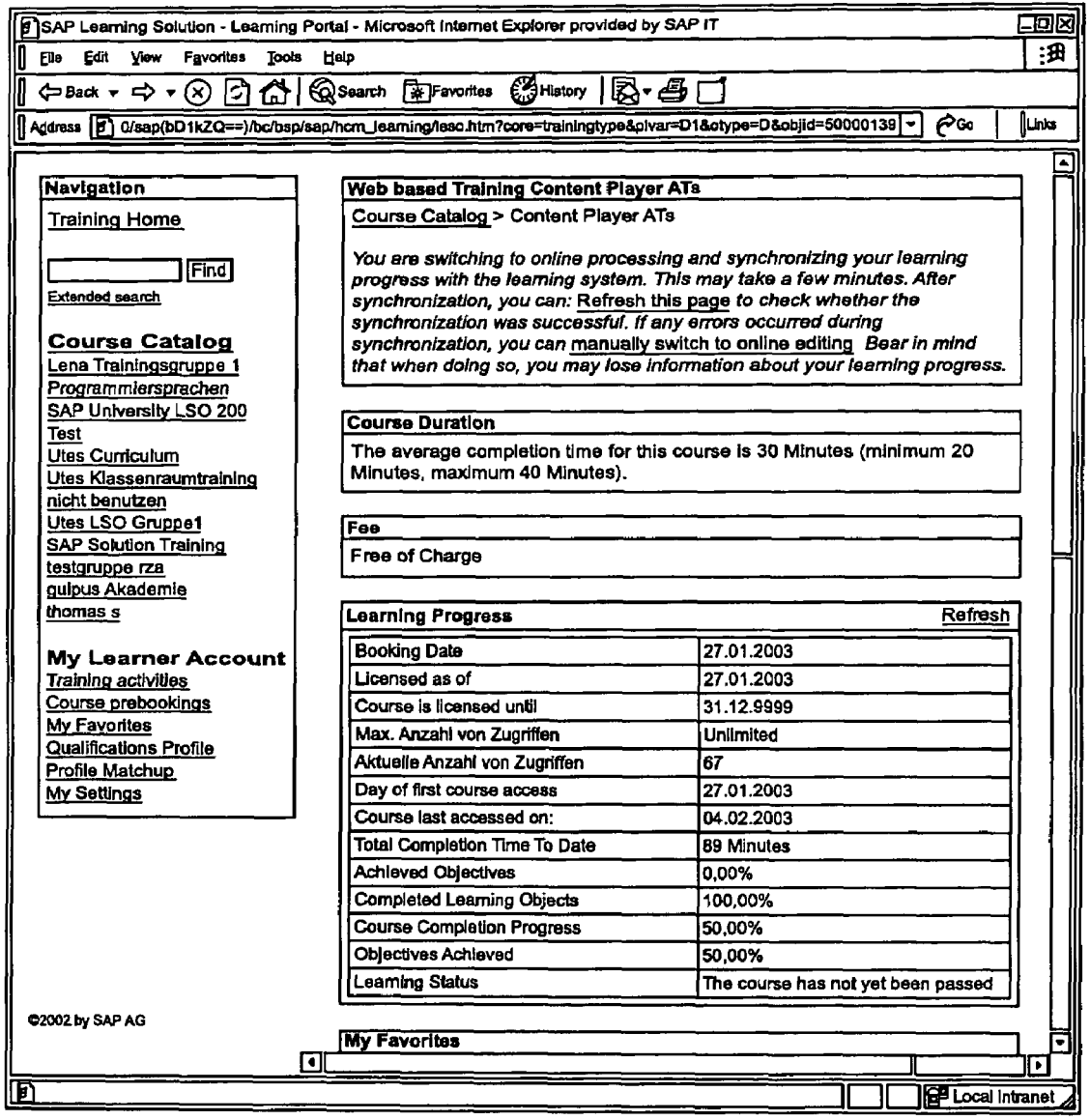

FIG. 19 shows a message that may be presented to a learner when switching to online processing. The message may indicate "You are presently matching the learning progress to the learning system and changing to online processing. This may take several minutes. After the match-up, you can refresh this page to check whether the match-up was successful. If an error has occurred during the match-up, you can switch to online processing manually. Make sure that information pertaining to your learning progress does not get lost."

Selecting the hyperlink "refresh this page" reloads the frame. If the data match-up was successful, the online state and the corresponding text is displayed. Selecting the hyperlink "switch to online processing manually," causes the learner portal to switch the training state to "online."

Figure 20:
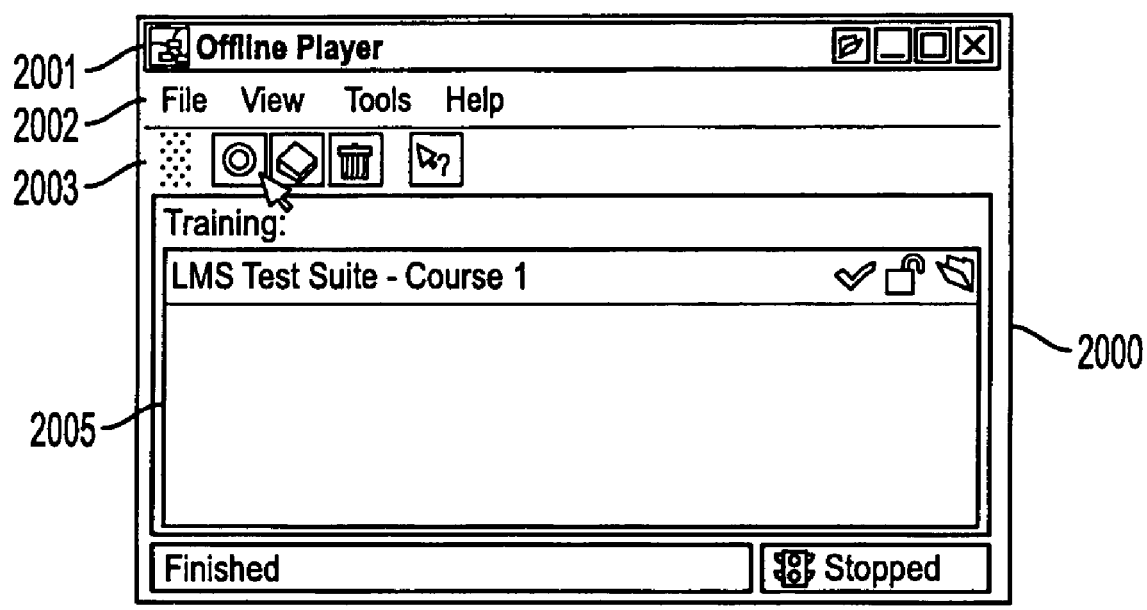
FIG. 20 is an exemplary offline manager interface.

As shown in FIG. 20, the offline manager interface screen 2000 includes a title bar 2001, a menu bar 2002 with one or more drop down menus, a tool bar 2003, and a main content screen 2005. The drop down menu 2002 may be used to change local settings (e.g., proxy settings for download and synchronization manager) and to delete courses. The titles of all locally available courses are displayed as a list or icons on the main content area of the screen. A scroll bar may be provided if the entire list may not be display at the same time. The desired course may be selected from the list.

The list also may include a number of icons associated with each course, for example, a check mark, a lock, and a folder. The check mark may indicate the download of the course material has been completed. A closed lock may indicate that the course may not be accessed, for example, because the course is being presented online. An open lock may indicate that the course may be accessed/viewed offline. An open folder symbol may indicate that the course is available for offline usage. A closed folder symbol may indicate that the course has been closed for offline use and that the downloaded files can be safely deleted.

Selecting the course starts the offline content player. The offline content player interacts with the browser of the learning station 610 to present the course to the learner in the same manner as an online course is presented. A stop and go light may be used to indicate whether the offline content player is active (e.g., red indicating the offline content player is stopped and green indicating the offline content player is presenting a course.)

A number of implementations have been described. Nevertheless, it will be understood that various modifications may be made. For example, advantageous results may be achieved if the steps of the disclosed techniques are performed in a different order and/or if components in a disclosed system, architecture, device, or circuit are combined in a different manner and/or replaced or supplemented by other components. Accordingly, other implementations are within the scope of the following claims.

What is claimed is:

1. A method of taking a course offline, the method comprising:
    transmitting a selection of the course online;
    obtaining course content and metadata associated with the course from an online learning system, the metadata comprising learner-independent metadata and learner-specific metadata, the learner-independent metadata corresponding to course content that is not specific to a learner, the course content comprising structural elements that make up the course, and the learner-specific metadata comprising data associated with the course that is specific to the learner, the data corresponding to a learning strategy for selecting structural elements to present in the course, the learning strategy comprising a macrostrategy and a microstrategy, the macrostrategy specifying how to present a first set of the structural elements, the microstrategy specifying how to present a second set of the structural elements;
    storing the metadata and course content in storage;
    processing a course state associated with the course, the course state being stored as a variable, wherein processing the course state comprises transitioning the variable from an online state to a going offline state to an offline state, the online state indicating that the course is presentable online, the going offline state indicating that the course will be transitioning from online presentation to offline presentation, and the offline state indicating that the course is presentable offline; and
    activating an offline player to present the course offline from the storage using the metadata and the course content, the offline player being configured to present the course after the offline state is reached but not during the going offline or online states, the course being presented offline without communication to the learning system during presentation.

2. The method of claim 1, wherein the course state comprises a central state and a local state, the local state being for a first system that performs the method and the central state being for a second system from which the course content and metadata are obtained; and
    wherein the local state and the central state transition according to the following sequence: the central state transitions from online to going offline, the local state transitions from online to going offline, the central state transitions from going offline to offline, and the local state transitions from going offline to offline.

3. The method of claim 2, further comprising synchronizing a local learner account and a central learner account.

4. The method of claim 3, wherein the central learner account and the local learner account are synchronized when the central state and local state are both going offline.

5. The method of claim 2, further comprising providing access to the course if the local state and central state are offline.

6. The method of claim 1, further comprising changing from offline presentation of the course to online presentation of the course, wherein changing comprises transitioning from an offline state to a going online state to an online state, the going online state indicating that the course will be transitioning from offline presentation to online presentation.

7. The method of claim 6, wherein the course state comprises a central state and a local state, the local state being for a first system that performs the method and the central state being for a second system from which the course content and metadata are obtained; and
    wherein the local state and the central state transition according to the following sequence: the local state transitions from offline to going online, the central state transitions from offline to going online, the local state transitions from going online to online, and the central state transitions from going online to online.

8. The method of claim 1, further comprising blocking access to the course offline if an error occurs while processing the course state.

9. An offline learning station comprising:
    a learning interface to select a course to be taken offline;
    a communications interface to obtain course content and a learner-specific packaging list for the course from an online learning system, the learner-specific packaging list comprising a generic packaging list and learner-specific metadata, the generic packaging list comprising learner-independent metadata corresponding to course content that is not specific to a learner, the course content comprising structural elements that make up the course, and the learner-specific metadata comprising data associated with the course that is specific to the learner, the data corresponding to a learning strategy for selecting structural elements to present in the course, the learning strategy comprising a macrostrategy and a microstrategy, the macrostrategy specifying how to present a first set of the structural elements, the microstrategy specifying how to present a second set of the structural elements;
    an offline player to process the course content and learner-specific packaging list to present the course offline, the course being presented offline without communication to the online learning system during presentation; and an offline manager to manage a course state associated with the course to allow the offline player to present the course, the course state comprising a stored variable, wherein managing the course state comprises transitioning the variable from an online state to a going offline state to an offline state, the online state indicating that the course is presentable online, the going offline state indicating that the course will be transitioning from online presentation to offline presentation, and the offline state indicating that the course is presentable offline.

10. The method of claim 9, wherein the course state comprises a central state and a local state, the local state being for the offline learning station and the central state being for the online learning system; and wherein the local state and the central state are transitioned according to the following sequence: the central state transitions from online to going offline, the local state transitions from online to going offline, the central state transitions from going offline to offline, and the local state transitions from going offline to offline.

11. The method of claim 10, wherein the offline player synchronizes local learner account data associated with the offline learning station with learner account data stored in the online learning system when the central state and local state are both going offline.

12. The method of claim 11, wherein the offline manager transitions the local state from going offline to offline following successfully synchronizing the local learner account data associated with the offline learning station with the learner account data stored in the online learning system.

13. The station of claim 9, wherein the learner-specific packaging list includes access paths and metadata for files comprising the content of the course.

14. The station of claim 13, wherein the offline manager is configured to determine which of the files to download based on the learner-specific packaging list.

15. A system for presenting a course offline, the system composing:

one or more servers to store information associated with the course;

a learning station to select the course online for offline presentation, the learning station comprising (i) a communications interface to receive a packaging list for the course from the one or more servers, (ii) an offline manager to process the packaging list to present the course offline, the course being presented offline without communication to an online learning system during presentation, and (iii) a state manager to manage a course state, the course state comprising a stored variable;

wherein the packaging list comprises a generic packaging list and learner-specific metadata, the generic packaging list comprising learner-independent metadata corresponding to course content that is not specific to a learner, the content comprising structural elements that make up the course, and the learner-specific metadata comprising data associated with the course that is specific to the learner; and wherein the state manager is configured to transition the variable from an online state to a going offline state to an offline state, the online state indicating that the course is presentable online, the going offline state indicating that the course will be transitioning from online presentation to offline presentation, and the offline state indicating that the course is presentable offline, the learning station presenting the course after the offline state is reached.

16. The system of claim 15, wherein the one or more servers store central learner account information, and the state manager is configured to synchronize offline learner account data and the central learner account information.

17. The system of claim 16, wherein the state manager is configured to match central learner account information and local offline learner account data, and to provide an indication to the one or more servers to switch a centrally-maintained course state from online to going offline.

18. The system of claim 16, wherein the state manager switches the course state from going offline to offline if synchronizing is performed successfully.

19. The system of claim 18, wherein the state manager prevents presentation of the course when the course state is going offline or online.

20. The system of claim 15, wherein the offline manager prevents access to the course if an error occurs during transitioning.

* * * * *